(12) United States Patent
Schimek et al.

(10) Patent No.: US 10,995,957 B2
(45) Date of Patent: May 4, 2021

(54) SWIRL-STABILISED BURNER HAVING AN INERTISATION FRONT AND RELATED METHODS

(71) Applicant: Technische Universitat Berlin, Berlin (DE)

(72) Inventors: Sebastian Schimek, Berlin (DE); Panagiotis Stathopoulos, Berlin (DE); Christian Oliver Paschereit, Berlin (DE)

(73) Assignee: TECHNISCHE UNIVERSITAT BERLIN, Berlin (DE)

( * ) Notice: Subject to any disclaimer, the term of this patent is extended or adjusted under 35 U.S.C. 154(b) by 0 days.

(21) Appl. No.: 16/869,808

(22) Filed: May 8, 2020

(65) Prior Publication Data

US 2020/0263872 A1 Aug. 20, 2020

Related U.S. Application Data

(63) Continuation of application No. 15/060,482, filed on Mar. 3, 2016, now abandoned.

(51) Int. Cl.
*F23R 3/28* (2006.01)
*F23R 3/14* (2006.01)
*F23L 7/00* (2006.01)

(52) U.S. Cl.
CPC ............. *F23R 3/283* (2013.01); *F23L 7/005* (2013.01); *F23L 7/007* (2013.01); *F23R 3/14* (2013.01); *F23R 3/28* (2013.01); *F23C 2900/9901* (2013.01); *F23L 2900/07009* (2013.01);

(Continued)

(58) Field of Classification Search
CPC . F23L 7/007; F23L 7/005; F23L 2900/07009; F23R 3/28; F23R 3/14; Y02E 20/34; F23C 2900/9901
See application file for complete search history.

(56) References Cited

U.S. PATENT DOCUMENTS

| | | |
|---|---|---|
| 2,439,554 A | 4/1948 | Anderson |
| 2,458,541 A | 1/1949 | Urquhart |
| 4,148,185 A | 4/1979 | Somers |

(Continued)

FOREIGN PATENT DOCUMENTS

| | | |
|---|---|---|
| DE | 4212810 A1 | 10/1992 |
| DE | 112014004695 T5 | 7/2016 |

(Continued)

OTHER PUBLICATIONS

Office Action in Corresponding EP Application 17159131.6 dated Aug. 1, 2018, 4 pages.

(Continued)

*Primary Examiner* — David J Laux
(74) *Attorney, Agent, or Firm* — Workman Nydegger

(57) ABSTRACT

A burner for producing a stabilized flame with an inertisation front upstream from the stabilized flame includes a swirl generator and an inlet device with a passage therethrough. The swirl generator swirls an inert process medium about a swirl axis in a flow direction and one or more openings in the inlet device provide one or more partial mass flows containing combustion educts. The inert process medium inhibits combustion of the combustion educts through the inertisation front to displace the stabilized flame from the one or more openings.

7 Claims, 6 Drawing Sheets

(52) U.S. Cl.
CPC ..... *F23R 2900/00002* (2013.01); *Y02E 20/16* (2013.01); *Y02E 20/34* (2013.01)

(56) References Cited

U.S. PATENT DOCUMENTS

| | | | |
|---|---|---|---|
| 4,595,143 A | | 6/1986 | Simmons et al. |
| 5,165,241 A | * | 11/1992 | Joshi ................. F23R 3/286 |
| | | | 60/737 |
| 5,169,304 A | * | 12/1992 | Flament ............... F23C 7/004 |
| | | | 431/183 |
| 5,259,755 A | * | 11/1993 | Irwin ................. F23D 17/002 |
| | | | 431/182 |
| 5,775,091 A | | 7/1998 | Bannister et al. |
| 8,256,226 B2 | * | 9/2012 | Khan .................. F23D 14/24 |
| | | | 60/772 |
| 2011/0094239 A1 | * | 4/2011 | Koizumi ............... F23R 3/346 |
| | | | 60/776 |
| 2012/0043765 A1 | | 2/2012 | Glasgow |
| 2014/0045128 A1 | * | 2/2014 | Lee ..................... F23D 14/64 |
| | | | 431/354 |
| 2014/0283498 A1 | | 9/2014 | Horikawa et al. |
| 2015/0267611 A1 | | 9/2015 | Nemitallah et al. |
| 2016/0169160 A1 | | 6/2016 | Okada et al. |
| 2017/0254264 A1 | * | 9/2017 | Schimek .................. F23R 3/28 |
| 2019/0093948 A1 | * | 3/2019 | Katefidis ............... F26B 23/022 |

FOREIGN PATENT DOCUMENTS

| | | |
|---|---|---|
| WO | 97/06352 | 2/1997 |
| WO | 2011/113400 A1 | 9/2011 |
| WO | 2013/056819 A1 | 4/2013 |
| WO | 2015/053004 A1 | 4/2015 |

OTHER PUBLICATIONS

Office Action in Corresponding German Application 102016103797.4 dated Dec. 5, 2016, 10 pages.

European Search Report for application 17159131.6 dated Jul. 18, 2017, 9 pages.

Schimek, et al., "Blue Combustion Stoichiometric Hydrogen-Oxygen Combustion under Humidified Conditions," ASME Turbo Expo 2015: Turbine Technical Conference and Exposition; Combustion, Fuels and Emissions; Montreal, Quebec, Canada, Jun. 15-19, 2015, pp. 1-7.

Office Action in Corresponding German Application 102016103797.4 dated Nov. 5, 2020.

* cited by examiner

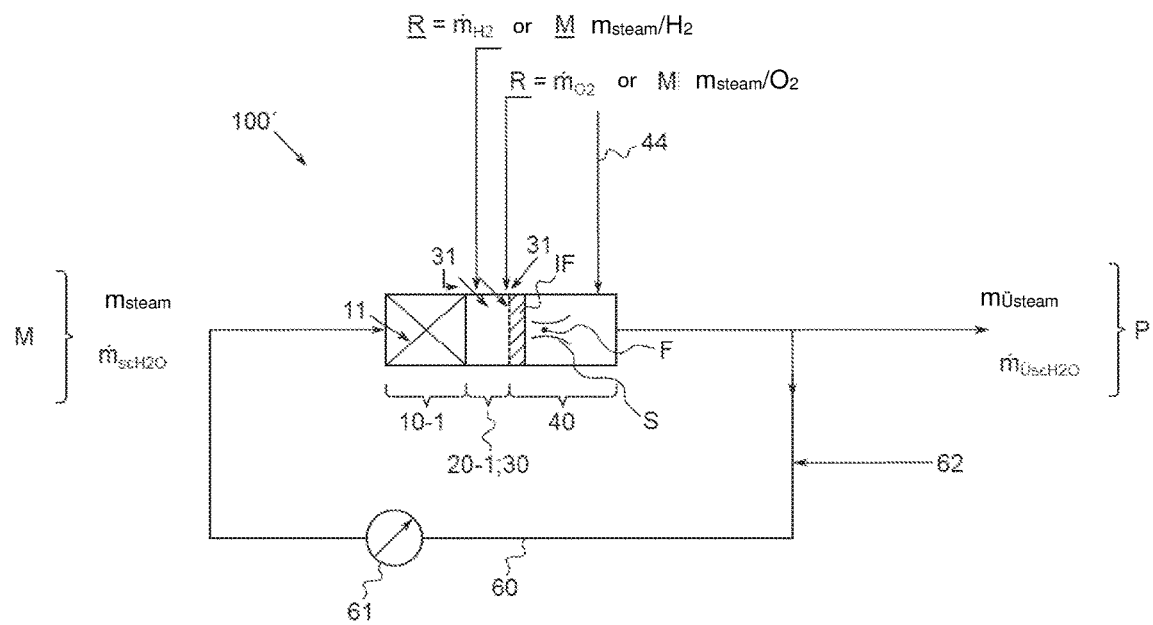
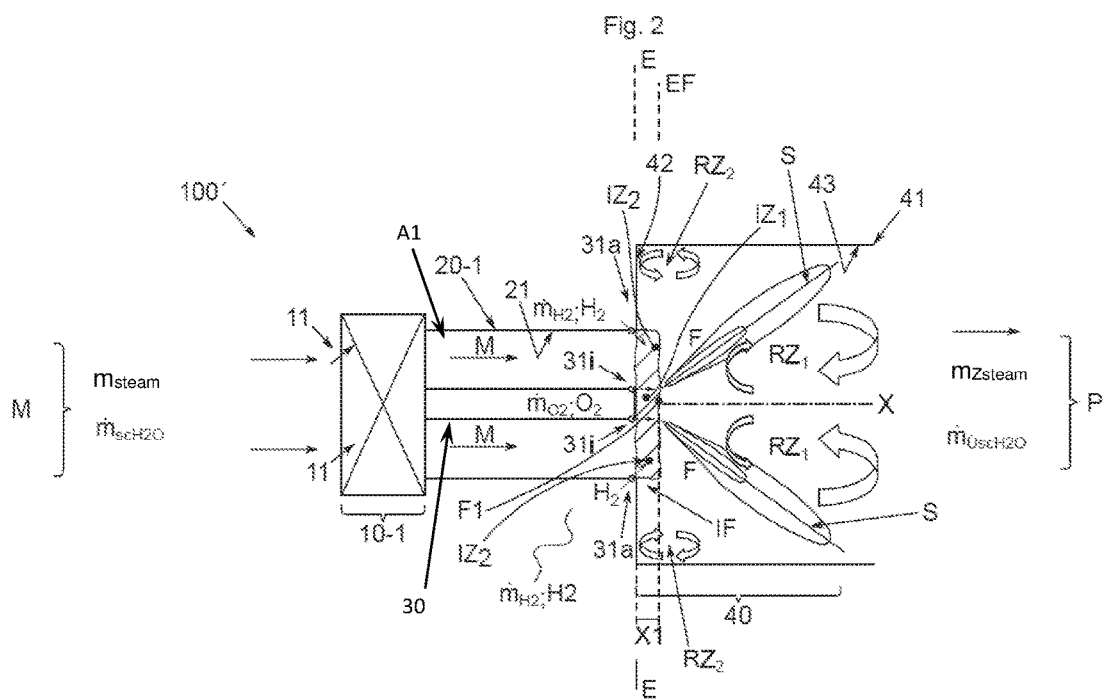
Fig. 3A

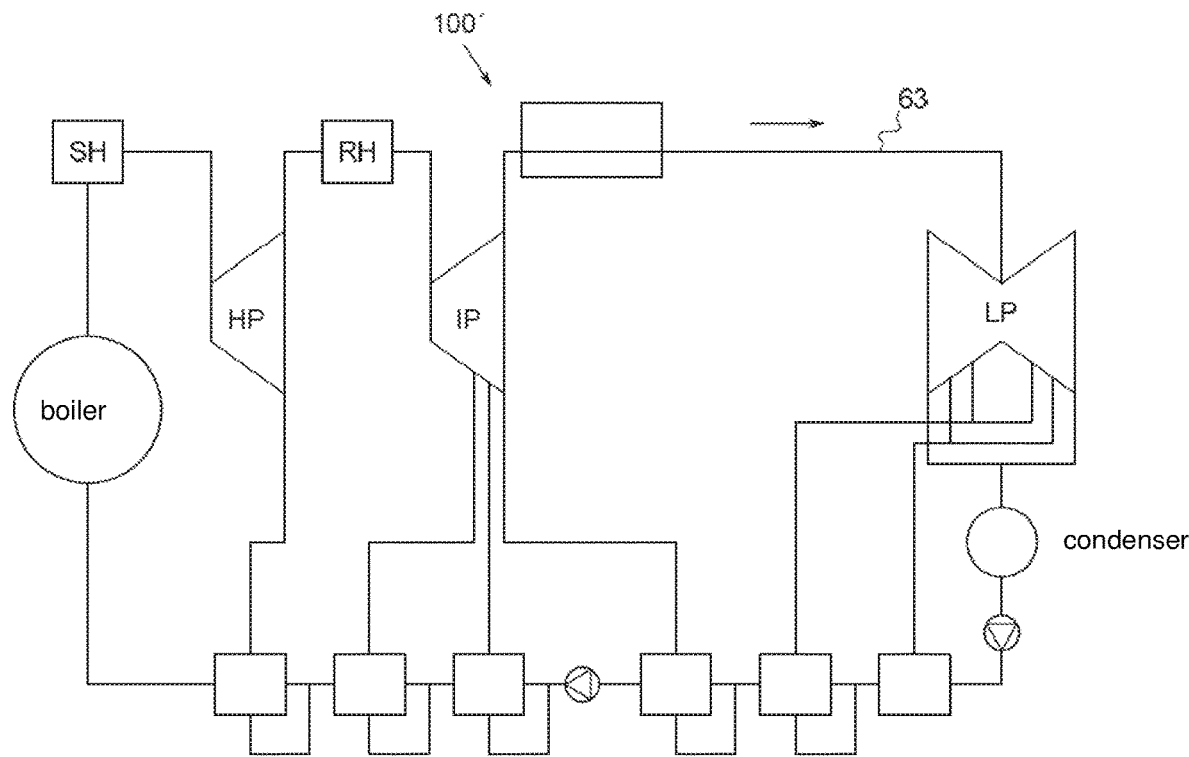

Fig. 4

| | Process medium M/ inertisation medium | Educt R (R-F) (fuel medium) | Educt R (R-O) (oxidation medium) | Combustion product P (heat supply by burning the combustion educts R) |
|---|---|---|---|---|
| 1 | steam $H_2O$ | hydrogen $H_2$ | oxygen $O_2$ | steam $H_2O$ |
| 2 | water – supercritical $scH_2O$ at supercritical pressure and supercritical temperature | hydrogen $H_2$ | oxygen $O_2$ | steam $H_2O$ |
| 3 | water – supercritical $scH_2O$ at supercritical pressure (temperature subcritical) | hydrogen $H_2$ | oxygen $O_2$ | steam $H_2O$ |
| 4 | water – supercritical $scH_2O$ at supercritical temperature (pressure subcritical) | hydrogen $H_2$ | oxygen $O_2$ | steam $H_2O$ |
| 5 | water $H_2O$ | hydrogen $H_2$ | hydrogen peroxide $H_2O_2$ | steam $H_2O$ |
| 6 | carbon dioxide $CO_2$ (supercritical pressure and/or temperature) | methane $CH_4$ | oxygen $O_2$ | mixture of steam $H_2O$ + carbon dioxide $CO_2$ |
| 7 | carbon dioxide $CO_2$ (supercritical pressure and/or temperature) | hydrocarbons | oxygen $O_2$ | mixture of steam $H2O$ + carbon dioxide $CO_2$ |
| 8 | helium He | hydrogen $H_2$ | oxygen $O_2$ | mixture of steam $H_2O$ + helium He |
| 9 | water $H_2O$ | ammonia $NH_3$ | oxygen $O_2$ | mixture of steam $H_2O$ + nitrogen $N_2$ |
| 10 | water $H_2O$ + ammonia $NH_3$ | ammonia $NH_3$ | oxygen $O_2$ | mixture of steam $H_2O$ + nitrogen $N_2$ |

Fig. 5

SWIRL-STABILISED BURNER HAVING AN INERTISATION FRONT AND RELATED METHODS

CROSS-REFERENCE TO RELATED APPLICATIONS

This application is a continuation of U.S. application Ser. No. 15/060,482 filed Mar. 3, 2016, the disclosure of which is incorporated herein by reference.

BACKGROUND OF THE DISCLOSURE

The use of renewable energies increases the demand for fast and flexible storage technologies and the fast availability of electricity in order to ensure power network stability.

A promising approach is the generation of hydrogen and oxygen by means of electrolysis and the subsequent storage. The possibility of using a closed cycle of water, hydrogen and oxygen is an attractive approach for an emission-free energy storage.

The reconversion of hydrogen into electricity in gas turbines and in combined-cycle gas turbine power plants is a challenging task. Hydrogen and oxygen mixtures are extremely reactive and lead to very high flame temperatures and flame velocities. In pilot plants so far, local chemical reactions and very high temperatures (1100° C. and higher) associated with them, which result in particular from the injection of hydrogen $H_2$ and of the oxygen $O_2$ oxidator solution, have caused undesired damage at the injection points and/or in the injection areas surrounding them at the nozzles and in the areas surrounding them. The reason being that the generated flame stabilises in a disadvantageous manner already near the nozzle openings.

So-called rocket burners are also known. Steam is added to the burner of the rocket burner downstream from the burner during the process. In this combustion technology, very high flow velocities which are even higher than the rate of combustion are generated in the combustion chamber and in the proximity of the nozzles injecting the combustion educts, also called injectors such that the flame advantageously does not stabilise in the zone of the nozzle feeding the fuel. The flame is carried downstream by the high flow velocities of the combustion educts. This known technology, however, has the disadvantage that the burnout is not optimal and the concentration of unburned hydrogen and oxygen in the generated steam is relatively high, whereby the further use of the steam, e. g. in a steam turbine process for power generation has not been possible so far.

To improve the combustion, swirl-stabilised burners are known from the gas turbine industry, which have meanwhile become widely used. The swirl-stabilised burners are characterised by a very good mixing quality, whereby the burnout of the combustion educts is optimised. A swirl is applied to main combustion medium such that a recirculation zone is formed by adding an oxidation medium at the combustion chamber inlet, in the shear layer/layers of which the flame stabilises. However, there continue to be local chemical reactions and associated with them very high temperatures at the nozzles or nozzle openings of the oxidation medium such that unwanted damage is still caused at the nozzles and in the areas surrounding the nozzles.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In an embodiment, a burner includes at least one swirl generator, an inlet device, and a plurality of openings in the inlet device. The at least one swirl generator is configured to swirl an inert process medium about a swirl axis extending in a flow direction. The inlet device is downstream in a flow direction from the swirl generator and has a passage in fluid communication with the at least swirl generator. The plurality of openings are downstream in the flow direction from the at least one swirl generator and are configured to provide one or more partial mass flows including at least a fuel medium and an oxidation medium to the passage of the inlet device.

In another embodiment, a method of combustion includes swirling the process medium in a passage with a swirl generator about a swirl axis in a flow direction; providing one or more partial mass flows to the passage through one or more openings in the passage; mixing the one or more partial mass flows in the process medium to produce a combustion medium; combusting the combustion medium downstream a front distance from the openings; and establishing an inertisation front displacing a flame the front distance from the openings in the flow direction.

In yet another embodiment, a burner includes at least one swirl generator, an inlet device having a plurality of passages, and a plurality of openings in the inlet device. The at least one swirl generator is configured to swirl an inert process medium about a swirl axis extending in a flow direction. The inlet device is downstream in a flow direction from the swirl generator and the plurality of passages are in fluid communication with the at least swirl generator. The plurality of openings are downstream in the flow direction from the at least one swirl generator and are configured to provide one or more partial mass flows including at least a fuel medium and an oxidation medium to the plurality of passages of the inlet device.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE FIGURES

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 2 shows the method according to the invention applying a burner of the invention according to an embodiment according to the FIGS. 3A to 3G using the example of steam superheating in a schematic principal sectional view;

FIG. 3A shows a burner according to the invention in a first embodiment in a schematic principal sectional view;

FIG. 4 is an exemplary application of a burner according to the invention and of the related method according to the invention; and FIG. 5 is a table showing potential combinations of process media and combustion educts usable with the burner according to the invention and the method according to the invention, and specifying the combustion product.

DETAILED DESCRIPTION OF FIGURES

Figure 1A:
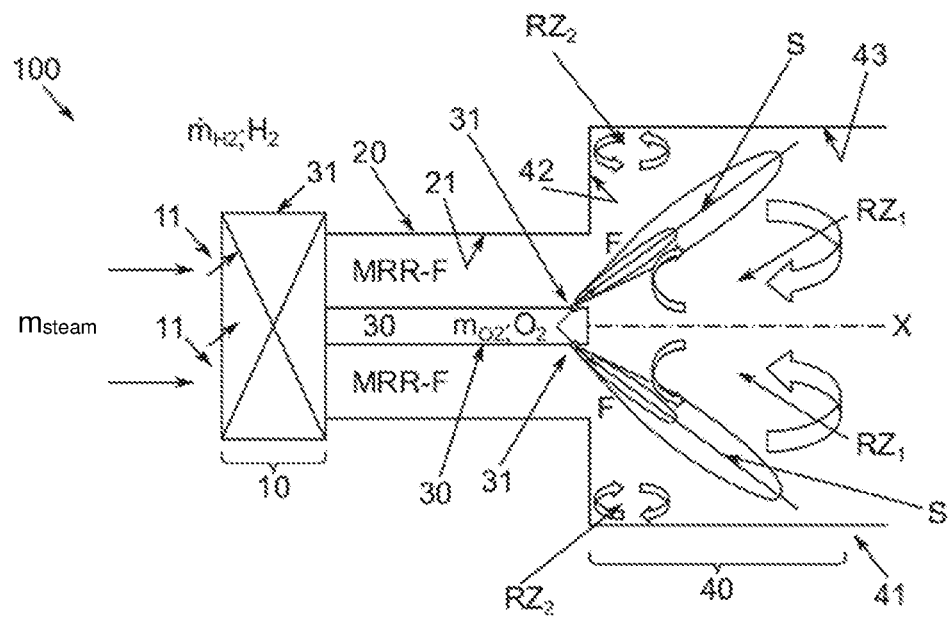
FIG. 1A shows a burner of the prior art in a schematic principal sectional view.

The invention is explained by reference to an $H_2/O_2$ burner 100, the combustion educts R of which are hydrogen $H_2$ as a fuel medium R—F and oxygen $O_2$ as an oxidation medium R—O, and the process medium M of which is steam.

The present invention has the purpose of providing a burner ensuring an optimal burnout of the combustion educts and not causing any damage at the injection points or in the injection point areas of the combustion educts such that the durability of the burner increases and the quality of the finished product rises.

The invention starts with a burner designed for making a combustion product in order to swirlingly supply at least two combustion educts, at least one combustion educt as a fuel medium and at least one combustion educt as an oxidation medium, and at least one process medium having inerting properties to the combustion chamber arranged downstream of the burner such that a swirl-stabilised flame is formed in the combustion chamber, wherein the burner includes at least one swirl generator to stabilise the flame.

It is provided according to the invention that the burner has openings in at least one inlet device, by which the partial mass flows can be supplied separately of each other to the combustion chamber as follows:

First Design Variant a):
Supply of the combustion educts through the respective at least one opening and supply of the process medium through at least one opening.

Second Design Variant b):
Supply of the combustion educts through the respective at least one opening by pre-mixing at least one of the combustion educts with the process medium to form a process medium-educt mixture.

Third Design Variant c:)
Supply of the combustion educts through the respective at least one opening while pre-mixing at least one of the combustion educts with the process medium to form a process medium-educt mixture, and additional supply of the process medium through the at least one opening.

It is provided for all design variants in a similar way that the openings in the at least one inlet device are arranged such that the partial mass flows of the combustion educts and/or the process medium-educt mixtures converge while forming the swirl-stabilised flame only behind an inertisation front, which is formed through the simultaneous presence of the inerting process medium in at least one of the partial mass flows, wherein the inertisation front is formed between the most downstream opening of one of the combustion educts or one of the process medium-educt mixtures or between the most downstream openings of the combustion educts and/or the process medium-educt mixtures and the respective combustion educts and/or process medium-educt mixtures converging in a flame foot of the flame.

According to the invention it is provided that the inlet device is arranged
i. in front of the swirl generator or
ii. integrated in the swirl generator or
iii. behind the swirl generator.

It is preferred that the openings of the combustion educts or of the process medium-educt mixtures are arranged radially to the axial longitudinal axis of the burner seen in one plane or in different planes.

It is further preferred that the at least one inlet device has exclusively one first passage or the first passage and at least one further passage.

Furthermore, an arrangement is preferred which provides that one swirl generator is assigned to at least one of the passages. In a preferred design of the invention a joint swirl generator or separate swirl generators are assigned to the at least one first passage and the at least one further passage.

Preferably, it is further provided that the openings for separately supplying the process medium and the combustion educts and/or the process medium-educt mixtures are arranged according to the variants a) and c) exclusively in the first passage or in a distributed manner in the first passage and/or the at least one further passage.

Preferably, it is further provided that the openings for separately supplying the combustion educts, wherein at least one of the combustion educts is supplied as a pre-mixed process medium-educt mixture, are arranged according to the variant b) exclusively in the first passage or in a distributed manner in the first passage and/or the at least one further passage.

The invention starts with a method for making a combustion product, in which at least two combustion educts, at least one combustion educt as a fuel medium and at least one combustion educt as an oxidation medium, and as least one process medium having inerting properties, are supplied in a swirled manner to a burner downstream of the combustion chamber such that a swirl-stabilised flame is formed in the combustion chamber, wherein the burner includes at least one swirl generator to stabilise the flame.

It is provided according to the invention that partial mass flows are separately supplied to the burner through openings in an inlet device.

According to the invention, the method is characterised in that the openings in the at least one inlet device—seen downstream of the burner—are arranged such that the partial mass flows of the combustion educts and/or the process medium-educt mixtures converge while forming the swirl-stabilised flame only behind an inertisation front, which is formed through the simultaneous presence of the inerting process medium in at least one of the partial mass flows, wherein the inertisation front is formed between the most downstream opening of one of the combustion educts and/or at least one of the process medium-educt mixtures or between the most downstream openings of one of the combustion educts and/or at least one of the process medium-educt mixtures and the respective combustion educts and/or process medium-educt mixtures converging in a flame foot of the flame.

It is preferred according to the invention that at least one of the combustion educts and the process medium are pre-mixed prior to being supplied into the at least one inlet device of the burner through the openings to form a process medium-educt mixture or are mixed after being supplied into the inlet device of the burner through the openings even before they converge with the other combustion educt or another process medium-educt mixture to form a process medium-educt mixture.

Furthermore it is preferred according to the invention that if exclusively one first passage is formed, an inertisation front is formed having an inner inertisation zone between the most downstream opening of one of the combustion educts and/or one of the process medium-educt mixtures or between the most downstream openings of the combustion educts and/or the process medium-educt mixtures and the respective combustion educts converging with the process medium-educt mixtures in a flame foot of the flame.

In another preferred embodiment it is provided that if one first passage and at least one further passage are formed, an inertisation front is formed having an inner inertisation zone and an outer inertisation zone between the most downstream opening of one of the combustion educts and/or one of the process medium-educt mixtures or between the most downstream openings of the combustion educts and/or the process medium-educt mixtures and the respective combustion educts converging with the process medium-educt mixtures in a flame foot of the flame.

In a variant design of the invention it is further provided that the swirl of a partial mass flow for the swirl-stabilised flame is generated in the first passage or in the first passage and/or in the at least one further passage.

Depending on the design variant, the respective actions can advantageously ensure that the partial mass flows of the separately supplied combustion educts or process medium-educt mixtures by no means are formed in the area of the openings of the combustion educts and/or process medium-educt mixtures, but only behind the inertisation front formed according to the invention, whereby the disadvantages of the prior art are overcome as the openings are advantageously protected from undesired chemical reactions and an excessive temperature load.

The combustion educts and process media that can be used for the burner and the related method are specified in the detailed description below and are also listed in the table of FIG. 5.

The invention is explained by means of figures in various embodiments, wherein the various design variants and the various configurations are explained in further detail in conjunction with the embodiments.

FIG. 1A initially shows a rotationally symmetric burner 100 of the prior art in a schematic principal sectional view. The burner 100 comprises a device that generates a swirl and is hereinafter called a swirl generator 10; an inlet device 20; and a combustion chamber 40.

A predeterminable partial mass flow of a process medium M, e.g. $\dot{m}_{Steam}$, is supplied to the swirl generator 10 at an opening 11, hereinafter called the process medium inlet opening 11.

Another predeterminable partial mass flow $\dot{m}_{H2}$ of hydrogen $H_2$ is supplied as a fuel medium R—F through a further educt injection opening 31.

The partial mass flow of hydrogen $H_2$ as the fuel medium R—F and the partial mass flow of the steam $\dot{m}_{Steam}$ as the process medium M are mixed in the swirl generator 10-1 and supplied to the inlet device 20-1 as a swirled steam/hydrogen mixture $\dot{m}_{Steam}/\dot{m}_{H2}$.

At the end of the inlet device 20-1 in the flow direction as illustrated by the arrows to the left and right of the swirl generator 10-1, openings, so-called educt injection openings 31 of an injection device 30 are arranged like a lancet on the inlet device 20-1 near the combustion chamber 40 formed in the longitudinal axis X of the burner 100 in a rotationally symmetric way. The longitudinal axis X of the burner 100 coincides with the swirl axis.

A swirl is a flow which rotates around the swirl axis extending in the flow direction.

The injection device 30 is provided within the inlet device 20-1 and is also arranged and formed in a rotationally symmetric manner on the longitudinal axis X of the burner 100.

A predeterminable partial mass flow mot oxygen $O_2$ is added as an oxidation medium R—O to the hydrogen-steam/$H_2$ mixture MRR-F through the educt injection openings 31.

As illustrated in FIG. 1A, a swirl is applied to the steam/$H_2$ mixture MRR-F to improve the combustion such that by adding the oxidation medium $O_2$ a recirculation zone RZ, in detail an inner recirculation zone $RZ_1$ and an outer recirculation zone $RZ_2$ is formed, in the shear layer/layers S of which the flame F stabilises.

The swirl is generated in a rotationally symmetric way as seen in the flow direction along the longitudinal axis X of the burner 100 and results in the flame geometry of the flame F as shown in FIG. 1A.

As mentioned, the recirculation zones $RZ_1$, $RZ_2$ improve the burnout and consequently the combustion quality. However, the above mentioned local chemical reactions and associated very high temperatures occur at the educt injection openings 31 such that damage is caused at the nozzles (not shown in more detail) and in the areas surrounding the nozzles.

In addition, there can be flashbacks of the flame F opposite to the flow direction (in all figures shown from left to right) such that the nozzles and the areas surrounding the nozzles, especially the injection points 31 or the injection areas, can be damaged by the local chemical reactions and the associated very high temperatures despite the formation of the stabilised flame F in the shear layer S.

Figure 1B:
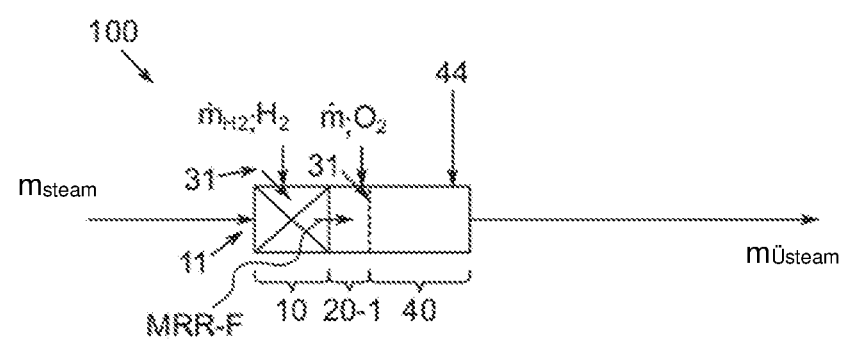
FIG. 1B shows a method for superheating steam using the conventional burner according to FIG. 1A in a schematic principal sectional view.

FIG. 1B illustrates—in conjunction with FIG. 1A—the known method using the example of steam superheating.

The following operations, herein called steps, take place essentially simultaneously and continuously while the burner 100' is in operation.

In a first step, steam $\dot{m}_{Steam}$ is supplied as the process medium M to the swirl generator 10-1 through the process medium inlet opening 11, as illustrated by the reference character $\dot{m}_{Steam}$.

At essentially the same time within the first step, the fuel medium R—F, in particular a predeterminable mass flow $\dot{m}_{H2}$ of hydrogen $H_2$ is supplied to the swirl generator 10-1 through an educt injection opening 31.

In a second step, the hydrogen $H_2$ as the fuel medium R—F and steam $\dot{m}_{Steam}$, e.g. having a temperature of 300° C., are mixed in the swirl generator 10-1, and in a third step fed into the at least one inlet device 20-1 as a swirled mixture MRR-F.

In a fourth step, oxygen $O_2$ is added as an oxidation medium R—O to the hydrogen/$H_2$mixture $\dot{m}_{Steam}/H_2$ through the educt injection openings 31 of the injection device 30 (cf. FIG. 1A).

During the second step, a swirl is applied to the steam/$H_2$mixture $\dot{m}_{Steam}/H_2$ to improve the combustion such that finally, by adding the oxidation medium O2 in the fourth step, a recirculation zone RZ, in detail the inner recirculation zone $RZ_1$ and an outer recirculation zone $RZ_2$, is/are formed at the inlet into the combustion chamber 40, in the shear layer/layers S of which the flame F stabilises.

Provided that no self-ignition is possible with the used combustion educts R, the flame F is ignited once by means of an ignition system and then continues to burn. The ignition system is not the subject-matter of the invention and the present description.

In a fifth step, the process medium M, i. e. the steam $\dot{m}_{Steam}$ is heated to 900° C., wherein the combustion educts R have been well mixed in the second step by the swirl generator 10-1 such that a good burnout is achieved in the combustion chamber 40, whereby superheated steam $\dot{m}_{ÜSteam}$ having a good degree of purity is generated as the product or combustion product P of the method.

A combustion chamber supply line 44 is optionally arranged at the combustion chamber 40, which is used to feed a cooling medium, in particular water, having a lower temperature than the process medium such that the superheated steam $\dot{m}_{ÜSteam}$ can already be cooled down in the combustion chamber 40 or the generated volume of steam is increased.

What remains unsolved, however, are the problems concerning damages occurring at the nozzles (not shown in more detail) and in the areas surrounding the nozzles.

This problem is solved by the burner 100' according to the invention.

The schematic sectional views of the following FIGS. 3A to 3G showing a burner 100' according to the invention, which explain the invention by way of the embodiments, illustrate a burner 100' according to the invention. The geometric structure of the burner 100' according to the invention is not restricted to rotationally symmetric burners 100'. A burner 100' according to the invention can e. g. also be rectangular or oval; or the passages arranged in the inlet device(s) don't have to be arranged in a rotationally symmetric way, as to be explained below.

In the following, embodiments and design variants of various burners 100' and the improved method according to the invention for making the combustion end product P will be described, wherein similarities and differences of the embodiments will become clear.

At the end of the description and in the table (cf. table according to FIG. 5), further process media M and combustion educts R as well as the related end products P will be named, which can also be used in the burner 100' according to the invention and in the associated method.

The process medium-educt mixtures MR used here are not mentioned in the table of FIG. 5. They result from mixing the respective process medium M with the respective combustion educt R.

The description uses the process media $\dot{m}_{Steam}$ or supercritical water $\dot{m}_{scH2O}$ and as combustion educts R, hydrogen $H_2$ as the fuel medium R—F and oxygen $O_2$ as the oxidation medium R—O, wherein superheated steam $\dot{m}_{ÜSteam}$ or superheated supercritical water $\dot{m}_{ÜscH2O}$ are generated as combustion end products P. Other process media M are possible (cf. again table of FIG. 5).

Supercritical water $\dot{m}_{scH2O}$ means water being supplied to the at least one inlet device 20-1 in the method at a supercritical pressure and a subcritical temperature, and which is further heated or superheated in the combustion chamber 40 such that it finally has a higher, especially supercritical temperature. Water $\dot{m}_{scH2O}$, however, also means water having already a supercritical pressure and a supercritical temperature when supplied to the at least one inlet device 20-1 such that heating or superheating is caused in the combustion chamber 40 by supplying heat, i. e. the temperature increases within the supercritical temperature range.

According to a first variant a) in some embodiments hydrogen $H_2$ as the fuel medium R—F and oxygen $O_2$ as the oxidation medium R—O as well as steam $\dot{m}_{ÜSteam}$ or supercritical water $\dot{m}_{scH2O}$ as a process medium M are separately supplied to the one inlet device 20-1—without pre-mixing. The hydrogen $H_2$ as the fuel medium R—F and/or the oxygen $O_2$ as the oxidation medium R—O can still be mixed with steam $\dot{m}_{ÜSteam}$ or supercritical water $\dot{m}_{scH2O}$ as a process medium M in the inlet device 20-1. Such a mixing operation is of advantage, but not mandatory in order to form the inertisation front IF according to the invention.

In an embodiment not explicitly shown, only the oxygen $O_2$ as the oxidation medium R—O and steam $\dot{m}_{Steam}$ or supercritical water $\dot{m}_{scH2O}$ are pre-mixed according to the second design variant b) and the third design variant c) in front of the at least one inlet device 20-1 such that a process medium-educt mixture MRR-O is formed.

In another embodiment which is also not explicitly shown, only hydrogen $H_2$ as the fuel medium R—F and steam $\dot{m}_{Steam}$ or supercritical water $\dot{m}_{scH2O}$, are pre-mixed in front of the at least one inlet device 20-1 according to the second design variant b) and the third design variant c) such that a process medium-educt mixture MRR-F is formed.

In another embodiment similarly not shown hydrogen $H_2$ as the fuel medium R—F is pre-mixed with steam $\dot{m}_{Steam}$ or supercritical water $\dot{m}_{scH2O}$, and oxygen $O_2$ as oxidation medium R—O with steam $\dot{m}_{Steam}$ or supercritical water $\dot{m}_{scH2O}$, in front of the at least one inlet device 20-1 according to the second design variant b) and the third design variant c) such that the process medium-educt mixtures MRR-F and MRR-O are formed.

Mixing the combustion educts R or the process medium-educt mixtures MRR-F and MRR-O, in particular hydrogen $H_2$ as the fuel medium R—F and oxygen 02 as the oxidation medium R—O takes place in all embodiments of the burner at a flame foot F1 of the flame F near the inlet opening into the combustion chamber 40 or only in the combustion chamber 40 and not in the at least one inlet device 20-1, wherein in addition to the formation of the inertisation front IF an essential aspect of the invention can be seen, as will be explained in detail below.

The idea of the invention is to use the inert properties of the process medium M, especially of steam $\dot{m}_{Steam}$ or of supercritical water $\dot{m}_{scH2O}$ to displace the reactive combustion educts R ($H_2/O_2$) from the educt injection opening 31 separately or by pre-mixing or mixing with a process medium M by inerting desired areas such that a chemical reaction of the extremely reactive combustion educts R at the educt injection openings 31 is excluded from the start.

According to the invention, the respective process medium M is simultaneously used as an inertisation medium by this approach and the combustion educts R are supplied to the at least one inlet device 20-1 separately from each other or by pre-mixing or mixing with the respective process medium M such that while adding the process medium M to generate the combustion end product P, the combustion of the combustion educts R only takes place in at least one area of the combustion chamber 40, in particular near the inlet opening of the combustion chamber 40.

The at least one inerted area is generated in the region of the educt injection openings 31 and at the educt injection openings 31 as such, whereby no local chemical reactions cause nozzle damages any longer, as will be explained in more detail below.

The inertisation of the educt injection openings 31 and the adjacent areas of the educt injection openings 31 leads to lower temperatures there compared to the temperatures found in prior-art burners 100.

In other words, lower temperatures than before are reached through the inertisation in the area around the educt injection openings 31 and at the educt injection openings 31 as such. The lower temperatures in the areas around the educt injection openings 31 and at the educt injection openings 31 as such advantageously result in a longer durability of the burner/s 100'.

First Embodiment According to FIG. 3A

FIG. 3A shows a burner 100' according to the invention, the essential structure of which differs from the conventional burner 100 according to FIG. 1A.

The burner 100' of the invention according to the design variant a) provides for a predeterminable mass flow of a process medium M, e. g. steam $\dot{m}_{Steam}$ or supercritical water $\dot{m}_{scH2O}$ to be fed through the swirl generator 10-1 and to be supplied to the combustion chamber 40 via the dedicated at least one inlet device 20-1.

According to the design variant a), hydrogen $H_2$ as the fuel medium R—F and oxygen $O_2$ as the oxidation medium R—O and steam $\dot{m}_{Steam}$ are supplied separately from each other at a different place compared to the prior art, i. e. into the at least one inlet device 20-1. Unlike in the prior art illustrated in FIG. 1A and 10-1A, a process medium-educt mixture MRR-F made of hydrogen $H_2$ as the fuel medium R—F and process medium M is not supplied to the swirl generator 10-1.

When comparing the FIGS. 1 and 3 and the related descriptions it becomes clear that hydrogen $H_2$ as the fuel medium R—F and oxygen $O_2$ as the oxidation medium are injected according to the invention into the at least one inlet device 20-1 via the educt injection openings 31, preferably near the combustion chamber opening of the combustion chamber 40.

In other words, partial mass flows of hydrogen $H_2$ as the fuel medium R—F and of oxygen $O_2$ as the oxidation medium R—O are added by the swirl generator 10-1 only in the inlet device 20-1 downstream of the place where the predeterminable partial mass flow of supercritical water $\dot{m}_{scH2O}$ or steam $\dot{m}_{Steam}$ is fed.

According to FIG. 3A the at least one inlet device 20-1 includes only one single passage A1, in which the lancet 30 with the lancet-sided educt injection openings 31i near the combustion chamber 40 is formed, through which oxygen $O_2$ is injected as an oxidation medium as shown in FIG. 3A. This passage is called the first passage A1 because the arrangement of a plurality of passages, so-called further passages, is part of the invention, as will be explained later.

The at least one inlet device 20-1 also includes wall-sided educt injection openings 31a near the combustion chamber opening of the combustion chamber 40, through which hydrogen $H_2$ is injected as a fuel medium as illustrated in FIG. 3A.

Near the combustion chamber 40 means that the educt injection openings 31a, 31i of at least one combustion educt R are arranged so close to the combustion chamber 40 and aligned in such a way that the flame foot F1 of the flame F is only formed in the combustion chamber 40. (Compare also FIG. 3B and the related description.)

A burner 100' according to the invention can comprise a plurality of passages A1, A2, A3, etc. or annuli, as explained in detail in the following embodiments.

A passage or annulus means an opening which enables the supply of partial mass flows of the process medium M, the combustion educts R or the process medium-educt mixtures MR made of one process medium M and one of the combustion educts R, into the combustion chamber 40.

It is noted at this point that it is also possible to inject a partial mass flow of hydrogen $H_2$ as a fuel medium R—F via the lancet-sided educt injection openings 31i and a partial mass flow of oxygen $O_2$ as an oxidation medium R—O via the wall-sided educt injection openings 31a. The combustion educts R and the process medium M may mixed to form a combustion medium.

In many applications the combustion chamber 40 opens as shown in FIG. 3A geometrically opposite to the inlet device 20 such that a combustion chamber wall 41 is formed, comprising in particular one combustion chamber front wall 42 and one combustion chamber longitudinal wall 43 or combustion chamber longitudinal walls 43.

In operation, the inner longitudinal wall 21 of the inlet device or the inner longitudinal walls 21 of the inlet device of the prior-art burners 100 shows/show damages caused by the flashback of the flame.

The inert properties of the process medium M, in particular of steam $\dot{m}_{Steam}$ provide a combustion method 100' according to the invention by means of the burner 100, 100' according to the invention, which overcomes the disadvantages (see the prior art method of FIG. 1B) and comprises the following steps:

The explanations are given in analogy to the description of the prior art method, i. e. steam $\dot{m}_{Steam}$ is used as the process medium M, and supercritical water $\dot{m}_{scH2O}$ could also be used.

The following operations of FIG. 2, which are called steps according to the invention, take place essentially simultaneously and continuously during the operation of the burner 100'.

In a first step according to the invention, exclusively a predeterminable partial mass flow of steam $\dot{m}_{Steam}$ is supplied as the process medium M to the swirl generator 10-1 through an injection opening in the first design of the method, e. g. at a temperature of 300° C.

In a second step according to the invention, a swirl is applied to the partial mass flow of steam $\dot{m}_{Steam}$ in the swirl generator 10-1 and fed into the inlet device 20-1, as shown by the arrows to the left and right of the swirl generator 10-1.

In a third step according to the invention, the unmixed combustion educts $H_2/O_2$, which are entrained by the already swirled partial mass flow of the steam in the vapour and also swirled in the second step, are supplied through the educt injection openings 31—in accordance with the first design variant a).

The partial mass flows of the two combustion educts, (i.e., the fuel medium and the oxidation medium) entering the at least one inlet device separately and without mixing according to the first design variant a) are swirled by the partial mass flow of the process medium M of steam $\dot{m}_{Steam}$, whereupon the combustion educts R in the steam atmosphere burn with the above described flame pattern of the flame F while the shear layer S is formed.

In the other designs of the method not explicitly shown in FIG. 2, the said partial mass flows are also supplied to the at least one inlet device 20-1, wherein at least one partial mass flow is swirled, whereupon the combustion educts R also burn in the steam atmosphere with the said flame pattern of the flame F while the shear layer S is formed.

In the second design variant b) the method is designed such that no separate partial mass flow of the process medium M is required since at least one of the combustion educts R is pre-mixed with the process medium M before it is supplied to the at least one inlet device 20-1. This means that the burner 100, 100' doesn't require the opening 11 in the design variant b). At least one of the two partial mass flows is swirled in the inlet device 20-1.

In the third design variant c) the method is designed such that a separate partial mass flow of the process medium M is provided although at least one of the combustion educts R is pre-mixed with the process medium M before it is supplied to the at least one inlet device 20-1. This means that the burner 100, 100' requires the opening 11 in the design variant c) for supplying the process medium M.

In contrast to the prior art, the flame foot F1 of the flame F is offset from the last educt injection opening/s 31 by a distance X1 as seen in the flow direction in all design variants a) to c) of the method according to the invention.

In other words, the flame foot F1 of the flame F is formed by the steam $\dot{m}_{Steam}$ used simultaneously as a process medium M and inertisation medium only downstream of the educt injection opening/s 31 such that an inner inertisation zone $IZ_1$ (cf. FIG. 3A) is created at the inner inflow opening 31i in the area of the flame foot F1 of the flame F.

The invention has the advantageous effect that an inner inertisation front $IZ_1$ is formed in the central area of the flame F, in particular in the area of the inner inflow openings 31i, which is also called the inertisation core zone of the inertisation front IF.

In addition, some embodiments (cf. the description referring to FIGS. 3E, 3F and 3G) have the effect that the geometric design of the combustion chamber 40 as shown, where the size of the combustion chamber 40 increases behind the inlet device 20-1, an inertisation zone IZ is also formed between the mantle surface of the flame F and the end wall 42 in the area of the outer inlet openings 31a, which is also called the outer inertisation zone $IZ_2$. In these cases the inner inertisation zone $IZ_1$ and the outer inertisation zone $IZ_2$ jointly form the inertisation front IF.

The inertisation front correspondingly forms an inert partition layer between the inlet openings 31a, 31i and the areas surrounding the inlet openings 31a, 31i and the flame foot F1 of the flame F.

The generation of the inertisation front IF solves the said purpose because no local chemical reactions take place in the said critical areas and the temperature is reduced in the said critical areas such that no damage is caused at the nozzles and the areas surrounding the nozzles.

The inertisation front IF with the inner inertisation zone $IZ_1$ (cf. FIGS. 3A, 3B, 3C and 3D and related description) or with the outer and inner inertisation zone $IZ_1$, $IZ_2$ (cf. FIGS. 3A, 3F and 3G and related description) are hatched in the figures.

According to the invention the recirculation zone RZ at the flame foot F1 of the flame F is formed only behind the inertisation front IF in a fourth step, in detail having the inner recirculation zone $RZ_1$ and the outer recirculation zone $RZ_2$, in the shear layer S of which the burning flame F forms and stabilises.

In the combustion chamber 40, the steam $\dot{m}_{Steam}$ is heated to e. g. 900° C. in a fifth step, wherein the combustion educts R in the shear layer S of the swirled steam flow $\dot{m}_{Steam}$ generated by the swirl generator 1-1 are mixed so well with each other that a good burnout is achieved in the combustion chamber 40, whereby superheated steam $\dot{m}_{ÜSteam}$ with a high degree of purity is finally generated.

It has been found that mixing hydrogen $H_2$ as a fuel medium R—F with steam $\dot{m}_{Steam}$ in the swirl generator 10-1 is not absolutely necessary to guarantee an optimal burnout. It is, however, crucial that the shear layer S is formed. The shear layer S generated by the swirl generator 10-1 of the generally swirled flow of at least one of the partial mass flows, especially of the partial mass flow of steam $\dot{m}_{Steam}$ has an effect on the inside of the combustion chamber 40. In other words, the inertisation front IF doesn't hinder the propagation of the flame F with the desired swirl behind the inertisation front IF, whereby the optimal burnout is ensured while the recirculation zones $RZ_1$, $RZ_2$ are formed.

In the first preferred embodiment according to FIG. 3A, the inner inlet openings 31i and the outer inlet openings 31a are arranged in an imaginary plane E extending in a radial direction orthogonally to the swirl axis X of the burner 100'. It was found that an effective inertisation front IF can be formed by means of a non-offset arrangement of the inner and outer inlet openings 31i, 31a in one plane E, and in particular near the combustion chamber 40.

It was also found that the axial length of the at least one inlet device 20-1 is variable.

In this connection it is proposed to form the burner 100' in a modular way (in two parts), wherein a swirl generator 10-1 and the inlet device 20-1 form one module each, which leads to a greater variability.

In a two-part design the inlet device 20-1 according to one design i) is arranged e. g. in front of the swirl generator 10-1, and in another two-part design the inlet device 20-1 according to a design iii) is e. g. arranged behind the swirl generator 10-1. It is understood that these designs can also be integral (one-piece).

In another design it is proposed to integrate the inlet device 20-1 according to a further design ii) into the swirl generator 10-1, preferably as one piece such that the burner 100' is an integral part. In such a design the inlet device 20-1 is arranged neither in front of nor behind the swirl generator 10-1 and also not between the swirl generator 10-1 and the combustion chamber 40, whereby a more compact burner 100' is provided.

The method is especially characterised in that (cf. FIG. 2) a partial mass flow of the combustion product P at the exit of the combustion chamber 40, in particular a partial mass flow of the superheated steam $\dot{m}_{ÜSteam}$ or of the superheated, supercritical water $\dot{m}Ü_{scH2O}$ is branched off like a bypass and cooled down by adding a cooling medium, in particular water having a lower temperature than the combustion end product P) through a bypass supply line 62 of a bypass return line 60 and returned into the burner 100, 100'.

Consequently, another operational step is performed, namely the return of the combustion product P through a bypass return line 60, in particular through a bypass transport device 61, especially a pump arranged in the bypass return line 60. This steam return is an optional operational step.

Furthermore, it can be optionally provided that the superheated steam $\dot{m}_{\ddot{U}Steam}$ or the superheated supercritical water $\dot{m}_{scH2O}$ is thermally influenced, especially cooled by another supply line already in the combustion chamber whereby the generated quantity of the process medium is increased at the same time.

To this end a combustion chamber supply line 44 is arranged at the combustion chamber 40 through which a cooling medium, in particular water having a lower temperature than the superheated steam $\dot{m}_{\ddot{U}Steam}$ or the superheated supercritical water $\dot{m}_{\ddot{U}scH2O}$ is supplied such that the superheated steam $\dot{m}_{\ddot{U}Steam}$ or the superheated supercritical water $\dot{m}_{\ddot{U}scH2O}$ are cooled down already in the combustion chamber 40.

The optional operational steps can be combined with each other or can be performed independently of each other.

Figure 3B:
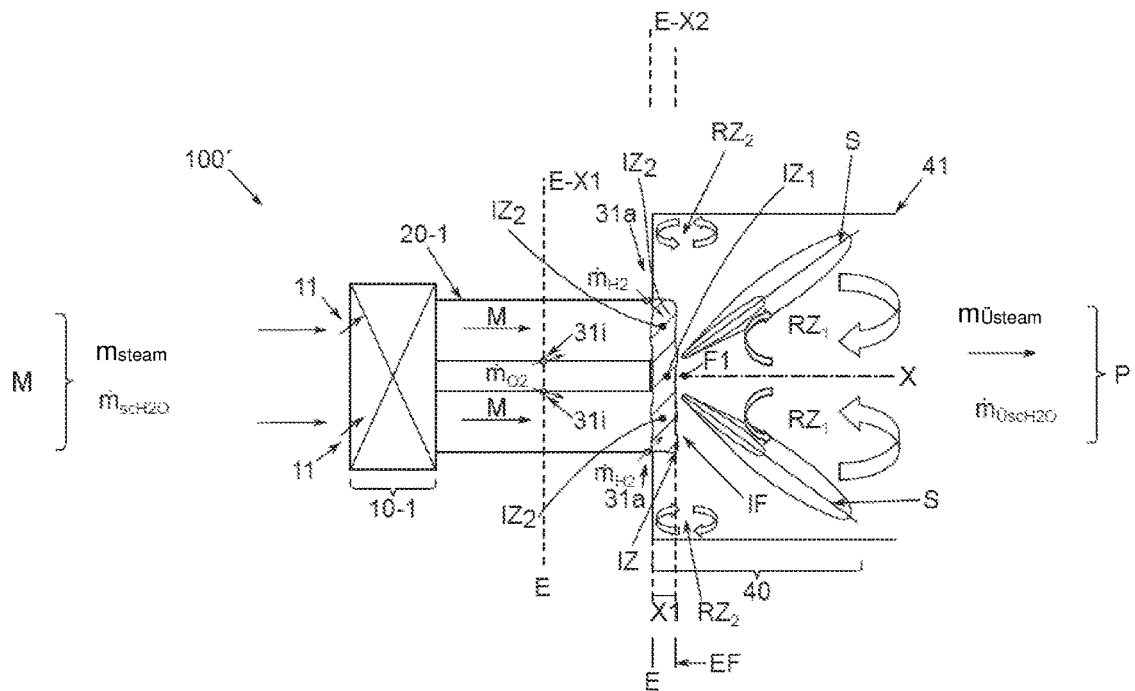
FIG. 3B shows a burner according to the invention in a second embodiment in a schematic principal sectional view.

Second Embodiment According to FIG. 3B

FIG. 3B shows a burner 100' according to the invention in a second embodiment in a schematic principal sectional view.

In this second embodiment according to the first design variant a) a partial mass flow of an unmixed combustion educt R—F, in particular hydrogen $H_2$, is supplied as a fuel medium R—F through the wall-sided educt injection openings 31a of the inlet device 20-1.

Furthermore, unmixed oxygen is supplied as an oxidation medium R—O to the inlet device 20-1 through the lancet-sided educt injection openings 31i such that a process medium-educt mixture MRR-O from the partial mass flow of oxygen $O_2$ as the oxidation medium R—O and the partial mass flow of the process medium M is formed only in the inlet device 20-1 because the process medium M is also separately supplied to the inlet device 20-1 through the process medium inlet opening 11 of the inlet device 20-1 integrated in the swirl generator 10-1.

As explained above referring to the first embodiment according to FIG. 3A, the inner and outer educt injection openings 31a, 31i of at least one combustion educt R are arranged near the combustion chamber 40 and aligned such that the flame foot F1 of the flame F is only formed in the combustion chamber 40.

The inner educt injection openings 31i in the second embodiment according to FIG. 3B are arranged in front of the outer educt injection openings 31a as seen in the flow direction.

The inner inlet openings 31i are arranged in an imaginary plane E-X1 extending orthogonally to the swirl axis X of the burner 100', wherein the imaginary plane E-X1 is situated in front of the imaginary plane E-X2 of the outer inlet openings 31a as seen in the flow direction.

It is understood that an arrangement is also possible in which the outer inlet openings 31a are positioned in an imaginary plane E-X1 extending orthogonally to the swirl axis X of the burner 100', and the imaginary plane E-X1 is positioned in front of the imaginary plane E-X2 of the inner inlet openings 31i as seen in the flow direction.

It becomes clear that the educt injection openings 31a, 31i of at least one combustion educt R are arranged so close to the combustion chamber 40 and aligned in such a way that the flame foot F1 of the flame F with the inertisation front IF situated in front of it is only formed in the combustion chamber 40.

Such an arrangement is possible as an embodiment because the combustion educts $H_2/O_2$ are supplied separately from each other only behind the imaginary plane E-X2 of the outer inlet openings 31a (if necessary, e. g. the partial mass flow of oxygen $O_2$ as the oxidation medium R—O is mixed with the process medium M still within the inlet device 20-1 to form the process medium-educt mixtures MRR-O, as shown in the second embodiment according to FIG. 3B) such that the local formation of the flame F with its flame foot F1 is guaranteed in analogy to FIG. 3A and the formation of the inertisation front IF in analogy to FIG. 3A.

It is pointed out once again that it is also possible unlike in FIG. 3 to inject hydrogen $H_2$ as a fuel medium R—F via the lancet-sided educt injection openings 31i and oxygen $O_2$ as an oxidation medium R—O via the wall-sided educt injection openings 31a.

An offset positioning of the educt injection openings 31a, 31i according to the second embodiment can be of advantage as the steam $\dot{m}_{Steam}$ can then be mixed in the inlet device 20-1 either with hydrogen $H_2$ as the fuel medium R—F and/or with oxygen $O_2$ as the oxidation medium R—O before the combustion educts H2/O2 converge behind the last imaginary plane E-X2 behind the inertisation front IF and react with each other.

Figure 3C:
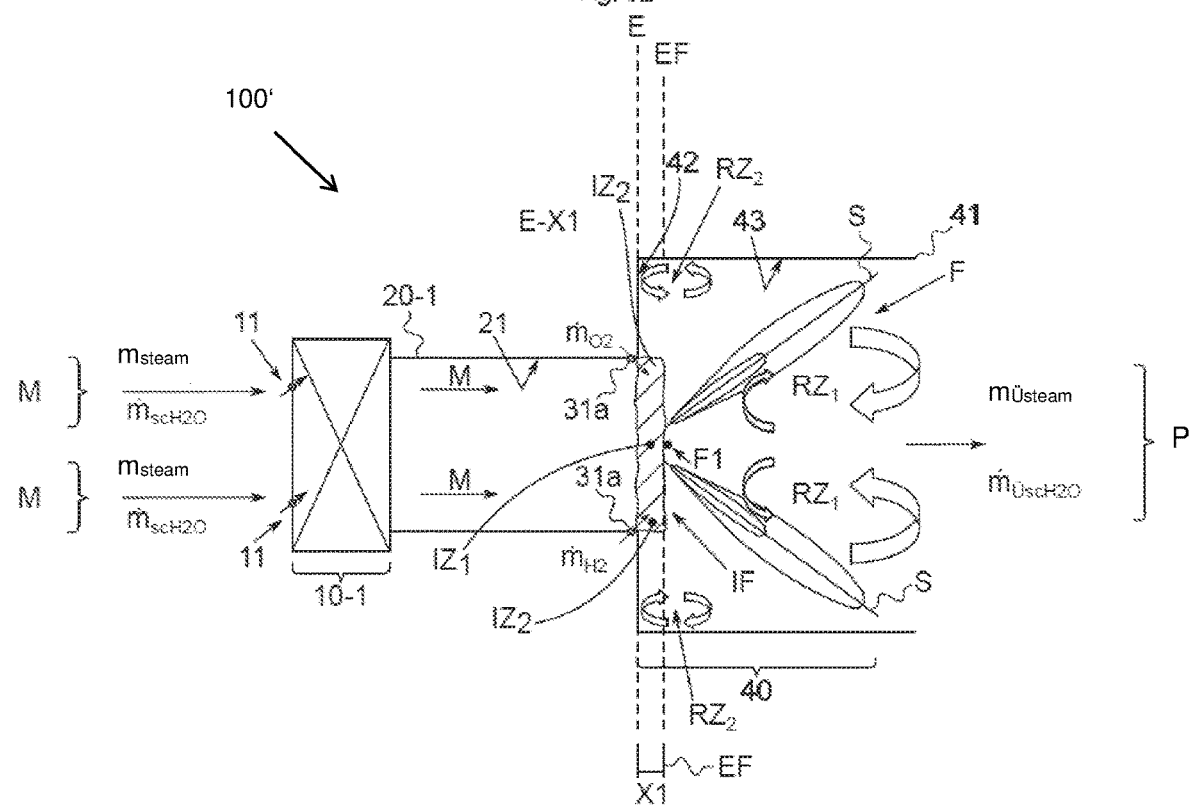
FIG. 3C shows a burner according to the invention in a third embodiment in a schematic principal sectional view.

Third Embodiment According to FIG. 3C

FIG. 3C shows a burner 100' according to the invention in a third embodiment in a schematic principal sectional view.

FIG. 3C illustrates that one inlet opening 31 is sufficient per combustion educt R in order to supply hydrogen $H_2$ as the fuel medium and oxygen $O_2$ as the oxidation medium to the combustion chamber 40.

This highlights that it is not absolutely necessary to have a symmetric arrangement, in particular a rotationally symmetric arrangement of inlet openings 31 for the respective combustion educt R in the inlet device 20-1.

The first design variant a) of the third embodiment provides as the outer inlet opening 31a an inlet opening 31a for hydrogen $H_2$ as the fuel medium R—F and an outer inlet opening 31a for oxygen $O_2$ as oxidation medium R—O.

The inlet openings 31a are positioned on a plane E like in FIG. 3A and in the related description. The swirl of the partial mass flows is again formed by rotating the process medium M at the exit of the inlet device 20-1 by means of the swirl generator 10-1 such that the flame pattern of the flame F and the effects described above in connection with the description of FIG. 3A remain unchanged.

The flame pattern of the flame F and the inertisation front IF are formed similarly as becomes clear by comparing FIG. 3C with FIG. 3A or FIG. 3B. It also illustrates that a lancet as shown in the FIGS. 3A and 3B is not absolutely necessary for injecting a combustion educt R.

Figure 3D:
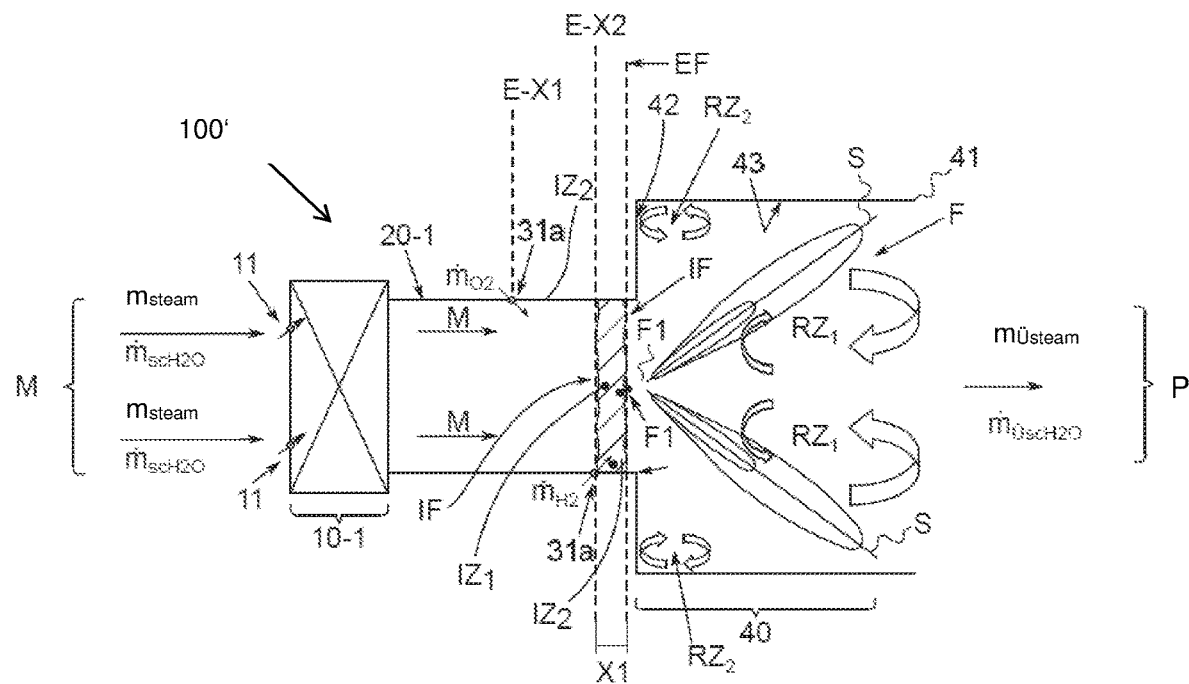
FIG. 3D shows a burner according to the invention in a fourth embodiment in a schematic principal sectional view.

Fourth Embodiment According to FIG. 3D

FIG. 3D shows a burner 100' according to the invention in a fourth embodiment in a schematic principal sectional view.

In a fourth embodiment deviating from FIG. 3C which also formed according to the design variant a), the inlet openings 31a formed as the outer inlet openings 31a for the partial mass flow of hydrogen $H_2$ as the fuel medium R—F and the partial mass flow of oxygen $O_2$ as oxidation medium R—O like in FIG. 3D are not arranged in one plane E-X1, E-X2 as seen in the flow direction.

One of the outer educt injection openings 31a of the combustion educts R is arranged in front of the other outer educt injection opening 31a as seen in the flow direction. This shows that an embodiment is also possible wherein the swirl is reached like in the preceding embodiments by swirling the partial mass flow of the process medium M by means of the swirl generator 10-1 such that the flame pattern of the flame F and the effects described above remain unchanged.

The flame pattern of the flame F and the inertisation front IF are formed similarly, as becomes clear especially by comparing FIG. 3D with FIG. 3C. It is also ensured in this fourth embodiment that at least one of the outer educt injection openings 31a of the combustion educts R is arranged so close to the combustion chamber 40 and aligned in such a way that the flame foot F1 of the flame F is only formed in the combustion chamber 40.

The principal sectional view of the burner 100' of FIG. 3D shows as one effect of this embodiment the mixing of hydrogen $H_2$ as the fuel medium R—F and oxygen $O_2$ as the oxidation medium R—O with the steam $\dot{m}_{Steam}$ before the mixtures MRR-F and MRR-O ($\dot{m}_{Steam}/H_2$ or $\dot{m}_{Steam}/O_2$) enter the combustion chamber 40. This can have positive effects in that an even shorter burnout time, an even better mixing result and thus an even better burnout of the combustion educts R are achieved.

Furthermore, the different predeterminable axial distances (seen in longitudinal direction) of the outer educt injection openings 31a allow for controlling the time until the respective mixture $\dot{m}_{Steam}/H_2$ or $\dot{m}_{Steam}/O_2$ enters the combustion chamber 40. This enables a variable response to certain conditions. Depending on which combustion educt R is injected first into the outer educt injection openings 31a in the flow direction, either the $\dot{m}_{Steam}/H_2$ mixture MRR-F or the $\dot{m}_{Steam}d/O_2$ mixture MRR-O can be advantageously subjected to a longer mixing period before it enters the combustion chamber 40.

Figure 3E:
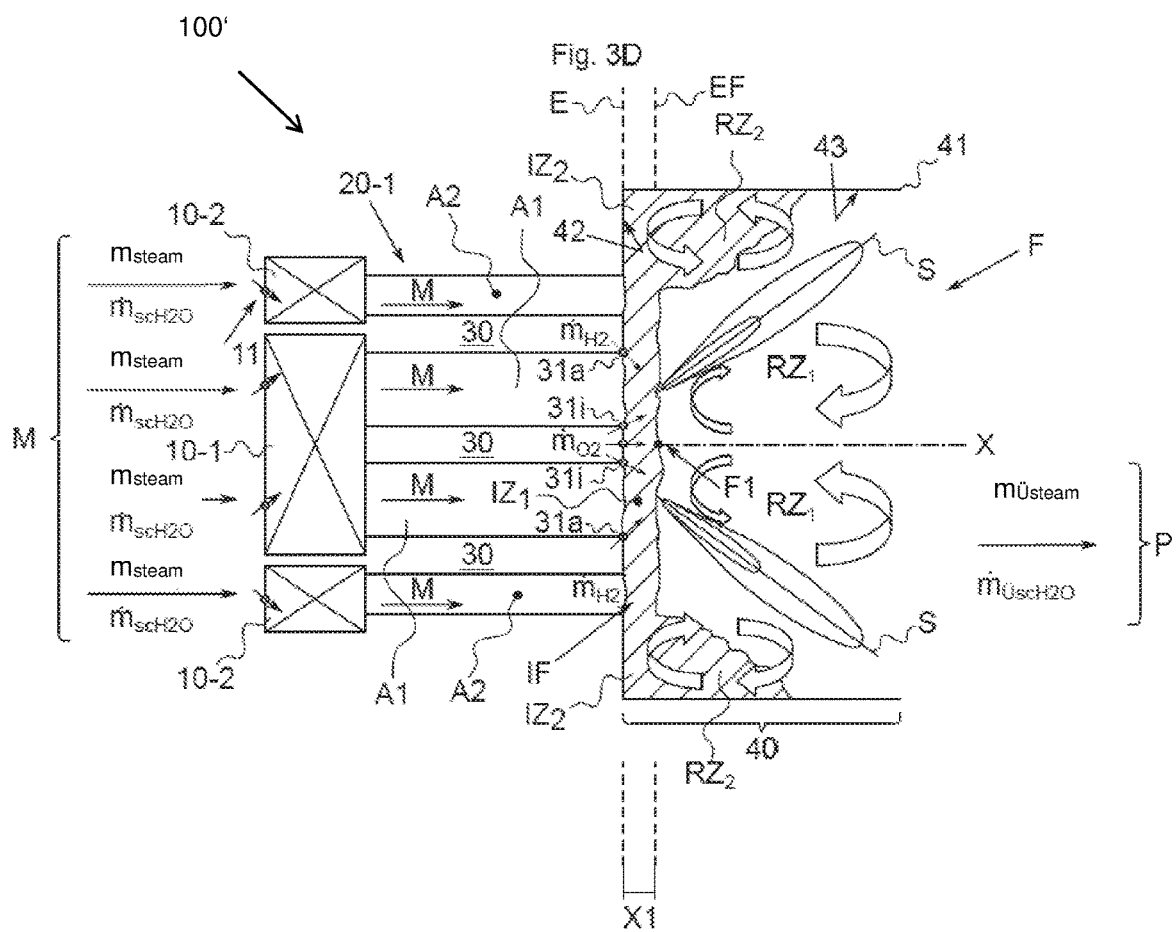
FIG. 3E shows a burner according to the invention in a fifth embodiment in a schematic principal sectional view.

Fifth Embodiment According to FIG. 3E

One inlet device 20-1 having two passages A1, A2.

FIG. 3E shows a burner 100' according to the invention in a fifth embodiment in a schematic principal sectional view. This fifth embodiment describes a single, the so-called first inlet device 20-1 having two passages, one first passage A1 and one second passage A2.

It has been found that the chemical reaction during the combustion of the combustion educts R—F, R—O is slightly poorer in the outer recirculation zone $RZ_2$ compared to the inner recirculation zone $RZ_1$ due to a poorer mixing and wall effects.

In addition to forming the outer inertisation zone $IZ_2$, an additional, especially a coaxial partial mass flow of steam $\dot{m}_{Steam}$ or supercritical water $\dot{m}_{zscH2O}$ is supplied to the combustion chamber 40, e. g. at the combustion chamber end wall 42, to fill the outer recirculation zone $RZ_2$ with the inertisation medium, especially steam $\dot{m}_{Steam}$ or supercritical water $\dot{m}_{scH2O}$.

The additional partial mass flow is part of a total mass flow which consists of the partial mass flow of steam $\dot{m}_{Steam}$ or supercritical water $\dot{m}_{zscH2O}$ and the additional partial mass flow of steam $\dot{m}_{zSteam}$ or supercritical water $\dot{m}_{zscH2O}$ and the partial mass flows of the combustion educts R—F, R—O or process medium-educt mixtures MRR-F, MRR-O, respectively.

The following arrangements are proposed for supplying the additional partial mass flows $\dot{m}_{zSteam}$, $\dot{m}_{scH2O}$.

The first inlet device 20-1 includes at least one further separate passage A2, through which at least on additional partial mass flow of steam $\dot{m}_{zSteam}$ or supercritical water $\dot{m}_{zscH2O}$ is supplied to the combustion chamber 40.

In this fifth embodiment, the at least one separate further passage A2 is part of the first inlet device 20-1, as schematically shown in FIG. 3E.

The burner 100' according to the fifth embodiment includes e. g. a rotationally symmetric, annular first passage A1 having a lancet 30 positioned on the longitudinal axis or swirl axis X. The burner 100' according to the fifth embodiment also includes an annular further passage A2 enclosing the first passage A1 in a rotationally symmetric manner.

In the design example according to the fifth embodiment, a separate swirl generator 10-2 is assigned to the further passage A2. As mentioned above, the arrangement of an additional swirl generator is an optional design.

To reach the desired flow pattern including an inner and outer recirculation zone $RZ_1$, $RZ_2$ of the flame F in the combustion chamber 40, at least one partial mass flow in one of the passages A1, A2 out of all arranged inlet passages A1, A2 must have a sufficiently high swirl component.

In other words, only the partial mass flow in the second passage A2 could include a swirl generator 10-2, and the partial mass flow in the first passage A1 doesn't have a swirl generator 10-1 or vice versa.

Furthermore, the partial mass flows in both passages, in the first passage A1 and in the second passage A2, can each include a swirl generator 10-1 and 10-2, the swirl of which can also be in the same or opposite direction.

FIG. 3E also illustrates that the passages A1, A2 are not necessarily but preferably arranged in a coaxial fashion.

The design according to the fifth embodiment results in that the emerging outer recirculation zone $RZ_2$, where a rather poor chemical reaction is expected, is filled more with steam $\dot{m}_{Steam}$ or supercritical water $\dot{m}_{scH2O}$ such that neither unburned hydrogen $H_2$ as the fuel medium R—F, oxygen $O_2$ as the oxidation medium R—O or $\dot{m}_{Steam}/H_2$ mixtures MRR-F or the $\dot{m}_{Steam}/O_2$ mixtures MRR-O can accumulate.

In the fifth embodiment the inner inlet openings 31i and the outer inlet openings 31a are arranged in an imaginary plane E extending orthogonally to the swirl axis X of the burner 100' like in the FIG. 3A or 3C. An offset arrangement in different planes E-X1, E-X2 is possible.

Figure 3F:
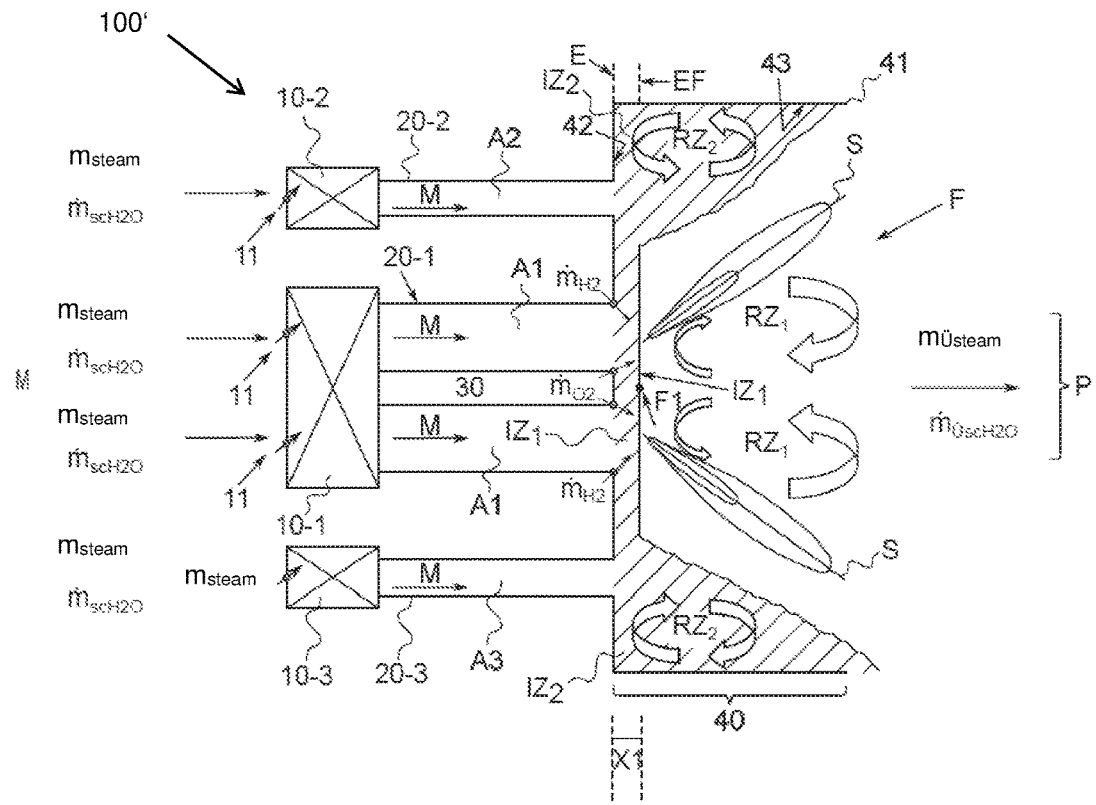
FIG. 3F shows a burner according to the invention in a sixth embodiment in a schematic principal sectional view.

Sixth Embodiment According to FIG. 3F

Three inlet devices 20-1, 20-2, 20-3 having one passage A1, A2, A3 each.

FIG. 3F illustrates a burner 100' according to the invention in a sixth embodiment in a schematic principal sectional view.

FIG. 3F shows that it is possible to design the burner 100, 100' and the method in a variable manner, wherein the burner 100' has a specific design to be explained below.

It is proposed to form the burner 100' according to the sixth embodiment with a plurality of—not rotationally symmetric—inlet devices 20-1, 20-2, 20-3, in particular having a coaxial orientation. At least one passage A1, A2, A3 is assigned to each inlet device 20-1, 20-2, 20-3.

This can result in different swirl numbers and/or swirl directions and/or educt concentrations of the combustion educts R—F, R—O and/or concentrations of the mixtures MRR-F, MRR-O for the partial mass flows in the inlet devices 20-1, 20-2, 20-3 or passages A1, A2, A3 while different shear layers are formed. In the shear layers, the flame F in the combustion chamber 40 has different properties, such as a targeted radial distribution of the combustion educts R—F, R—O and/or mixture concentrations MRR-F, MRR-O and/or a different swirl and/or different axial speeds in the combustion chamber 40.

Furthermore, a certain specific flow geometry of the flame F can be generated by influencing the partial mass flows in the plurality of passages A1, A2, A3 within the combustion chamber 40.

As regards the swirl direction and/or the swirl number around the respective swirl axis, a plurality of passages A1, A2, A3 offer in particular the effective possibility to generate the swirl of each of the partial mass flows independently of each other in the one or the other direction, or to predetermine the swirl number.

If there is only one passage A1 in an inlet device 20-1, the swirl direction can be selected, but this doesn't change the quality of the mixture of combustion educts R or the quality of the mixture of the combustion educts R with the process medium M.

If, however, a plurality of passages A1, A2, A3 are formed in an inlet device 20-1 or in a plurality of inlet devices 20-1, 20-2, 20-3, especially one first passage A1 and at least one further passage A2, or three passages A1, A2, A3 like in the sixth embodiment, and each of the passages A1, A2, A3 is in an operational engagement with a swirl generator 10-1, 10-2, 10-3 of its own, then the swirl direction and/or the swirl number of the partial mass flows can be selected. In the different variants, the swirl direction can be created variably either rotating in the same or the opposite direction, which can have an advantageous effect on the quality of the combustion educt mixtures R or on the quality of the combustion educt mixtures R—F, R—O or of the process medium educt mixtures MRR-F, MRR-O with the process medium, and on the flow geometry of the flame F depending on the chosen swirl direction in the three passages A1, A2, A3.

In the sixth embodiment the inner inlet openings 31*i* and the outer inlet openings 31*a* are arranged in the first passage A1 of the inlet device 20-1 in an imaginary plane E extending orthogonally to the swirl axis X of the burner 100' similarly to FIG. 3E and the related description.

In the passages A2, A3 of the inlet devices 20-2, 20-3 shown in the preferred design of the sixth embodiment according to the invention, no combustion educts R—F, R—O are supplied, but only the process medium M, in particular steam $\dot{m}_{zSteam}$ or supercritical water $\dot{m}_{zscH2O}$.

There is also the option to feed the combustion educts R—F, R-Oor the process medium-educt mixtures MRR-F, MRR-O to the combustion chamber 40 in at least one of the further passages A2, A3 of the inlet devices 20-2, 20-3 through injection openings 31 not shown in more detail.

Figure 3G:
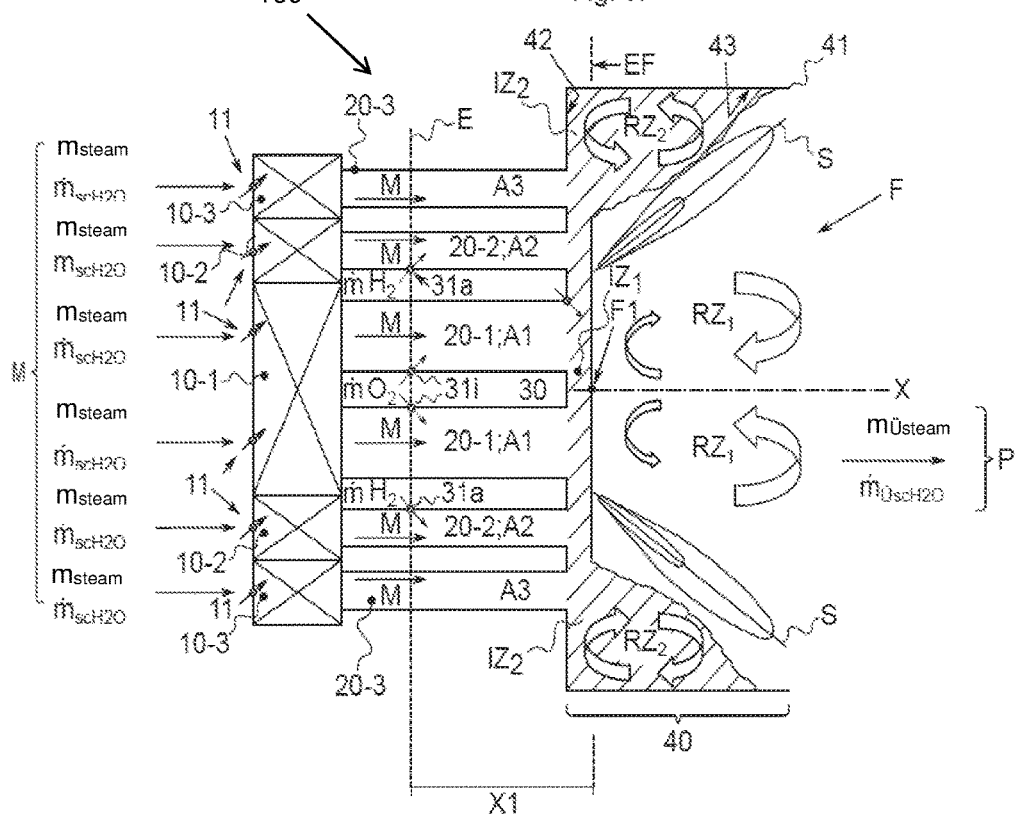
FIG. 3G shows a burner according to the invention in a seventh embodiment in a schematic principal sectional view.

Seventh Embodiment According to FIG. 3G

Three rotationally symmetric inlet devices 20-1, 20-2, 20-3 having one passage A1, A2, A3 each.

FIG. 3G shows a burner 100' according to the invention in a seventh embodiment in a schematic principal sectional view. The seventh embodiment illustrates a special variant of the sixth embodiment.

It has already been proposed to form the burner 100' according to the sixth embodiment with a plurality of further passages A1, A2, A3, in particular having a coaxial orientation.

According to the seventh embodiment a plurality of further inlet devices 20-2, 20-3 are arranged around the first passage A1 of the inlet device 20-1, especially in a rotationally symmetric way with reference to the inlet device 20-1 and to the combustion chamber 40.

This can result in the fact that in the plurality of passages A1, A2, A3 of the plurality of inlet devices 20-1, 20-2, 20-3, various swirl directions and/or swirl numbers and/or educt concentrations and/or mixture concentrations in different shear layers S being formed and having different properties, or a targeted radial distribution of the combustion educts R—F, R—O or of the process medium-educt mixtures MRR-F, MMR-O are generated in an axial flow direction in the combustion chamber 40.

In this seventh embodiment, a specific rotationally symmetric flow and flame geometry of the flame F can be advantageously generated more easily by the partial mass flows in the plurality of passages A1, A2, A3 of the plurality of inlet devices 20-1, 20-2, 20-3 within the combustion chamber 40.

FIG. 3G also shows that the educt concentration of the oxygen $O_2$ partial mass flow is changed in the first passage A1 by supplying steam $\dot{m}_{Steam}$ or supercritical water $\dot{m}_{scH2O}$ within the inlet device 20-1 such that, when entering the combustion chamber 40 as a steam/oxygen mixture $\dot{m}_{Steam}/O_2$ especially as a process medium-educt mixture MRR-O, a predeterminable partial mass flow is generated still in the inlet device 20-1.

The effect corresponds to the above described pre-mixing of oxygen $O_2$ as the oxidation medium R—O with steam $\dot{m}_{Steam}$ or supercritical water $\dot{m}_{zscH2O}$ to form the process medium-educt mixture MRR-O before the partial mass flow $\dot{m}_{Steam}/O_2$ enters the inlet device 20-1.

FIG. 3G also illustrates that the educt concentration educt concentration of the combustion educt R—F of the partial mass flow $\dot{m}_{Steam}/H_2$ can be changed in the second passage A2 by feeding steam $\dot{m}_{zSteam}$ or supercritical water $\dot{m}_{zscH2O}$ within the second inlet device 20-2, too, such that a predeterminable partial mass flow of the combustion educt R—F is finally generated when entering the combustion chamber 40 as the process medium-educt mixture MRR-H as steam/hydrogen mixture $\dot{m}_{Steam}/H_2$.

In the third further passage A3, exclusively a predeterminable additional partial mass flow of steam $\dot{m}_{zSteam}$ or an additional partial mass flow of supercritical water $\dot{m}_{zscH2O}$, is supplied to the combustion chamber 40, e. g. especially to form the outer inertisation zone $IZ_2$, having a predeterminable the size and shape.

At least one swirl generator 10-1, 10-2, 10-3 is assigned to each passage A1, A2, A3 as shown in the schematic principal perspective view such that the swirl numbers and/or the swirl directions can be advantageously set in a variable and separate fashion.

The other advantages and effects mentioned in connection with the sixth embodiment also apply to this seventh embodiment.

In the seventh embodiment according to FIG. 3F, the inner inlet openings 31*i* and the outer inlet openings 31*a* are arranged e. g. in the first passage A1 of the inlet device 20-1 in an imaginary plane E extending orthogonally to the swirl axis X of the burner 100' like in FIG. 3E and in the related description.

Another particularity of the seventh embodiment is the fact that the imaginary plane E is moved backwards as seen in the upstream direction, whereby the partial mass flows can mix to form the process medium-educt mixtures MRR-O or MRR-H still in the inlet devices 20-1, 20-2 or in their passages A1, A2 as explained above. The imaginary plane E, moved backwards in the passages A1, A2, is shown as a broken line in FIG. 3G.

It becomes clear that by moving them backwards in the upstream direction, the inner inlet openings 31$i$ and/or the outer inlet openings 31$a$ in the seventh embodiment are not arranged as close to the combustion chamber 40 any longer as at least one of the inlet openings 31$a$, 31$i$ of the preceding embodiments.

It is optionally even possible by moving them even further upstream according to the design ii) of the burner 100, 100' to arrange the inner inlet openings 31$i$ and/or the outer inlet openings 31$a$ within the individual swirl generators 10-1, 10-2, 10-3.

Finally it is also an option by moving them even further upstream according to the design i) of the burner 100, 100' to arrange the inner inlet openings 31$i$ and/or the outer inlet openings 31$a$ in front of the individual swirl generators 10-1. See in particular FIG. 3D and the related description which show that a move backwards is possible.

The plurality of passages A1, A2, A3 enable the formation of the inner inertisation zone $IZ_1$ and the outer inner inertisation zone $IZ_2$ in the desired size and shape and the given specific flow geometry of the flame F such that especially the injection points 31$a$, 31$i$ and also the combustion chamber walls 41; 42, 43 are protected.

In particular, the injection points 31$a$, 31$i$ are not any longer arranged in proximity to the flame foot F1. This means that the injection points 31$a$, 31$i$ are moved out of the high temperature region of the flame foot F1 of the flame F such that the injection points 31$a$, 31$i$ are arranged in an even more protected way than the other embodiments by placing them backwards. The injection points 31$a$, 31$i$ are additionally protected by the inertisation front IF formed between the exit of the inlet device 20-1 and the entrance of the combustion chamber 40.

Concerning the description and the illustration of the FIGS. 3E to 3G, the filling of the outer recirculation zone/s $RZ_2$ with the inertisation medium, in particular steam $\dot{m}_{Steam}$ or supercritical water $\dot{m}_{scH2O}$ via an additional swirl generator 10-3 in order to form the outer inertisation zone $IZ_2$ is only one of other possibilities.

First of all, it is also possible to use e. g. another inertisation medium. Secondly, it is possible e. g. to adapt the geometry of the combustion chamber 40 to the geometry of the flame F such that no outer recirculation zone $RZ_2$ is formed.

The method according to the invention and the burner 100' according to the invention are consequently characterised in that the injection points 31$a$, 31$i$ in the at least one inlet device 20-1, 20-2, 20-3 of the burner 100', in particular of the burner 100' of a hydrogen/oxygen steam generator, are protected from high temperatures by stabilising the flame F and forming an inertisation front IF.

In the burner 100' according to the invention, the injection points 31$a$, 31$i$ are protected by an inert atmosphere, in particular a steam atmosphere surrounding them.

This excludes a flashback of the flame F in these inerted regions and/or a stabilisation of the flame F as early as at the injection points 31$a$, 31$i$. The fuel medium R—F and the oxidation medium R—O or process medium-educt mixtures MRR-O, MRR-H are mixed advantageously at a predeterminable distance X1 only downstream of the injection points 31$a$, 31$i$.

ALL EMBODIMENTS

In accordance with the design variants a) and c), the exact propagation of the combustion educt R—O, R—H and/or the combustion educt mixture MRR-O, MRR-H injected through the inlet openings 31; 31$a$, 31$i$ in at least one of the passages A1, A2, A3 depending on the flow direction of the process medium M injected through the opening 11 depends on various factors which are taken into account individually or in combination, wherein the factors are as follows:

- direction and amount of the impulse of the combustion educt R—O, R—H or of the process medium-educt mixture MRR-O, MRR-H;
- direction and amount of the impulse of the process medium M;
- design of the geometry, of the diameter, position and the injection angle of the injection openings;
- swirl number (corresponds to the amount of the swirl strength) and speed of the process medium M and/or of the combustion educt R—O, R—H and/or the process medium-educt mixture MRR-O, MRR-H;
- radial extension of the corresponding passage(s) A1, A2, A3;
- distance of the injection openings 31 (if arranged in different planes EX1, EX2) in an axial direction of the passages A1, A2, A3).

It is understood that the burner 100, 100' is designed accordingly or that it includes the corresponding means so as to be able to influence the factors which also characterise the method.

If the factors are adequately set it is avoided that the oxidation medium R—O or the process medium-educt mixture MRR-O reaches the injection openings 31; 31$a$, 31$i$ of the fuel medium R—H or of the process medium-educt mixture MRR-H, or that the fuel medium R—H or the process medium-educt mixture MRR-H reaches the injection openings 31; 31$a$, 31$i$ of the oxidation medium R—O or of the process medium-educt mixture MRR-O.

The design variant b) provides for a supply of the combustion educts R—O, R—H while at least one of the combustion educts R—O, R—H is pre-mixed with the process medium M to form a process medium-educt mixture MRR-O, MRR-H through the respective at least one opening 31; 31$a$, 31$i$.

In accordance to the design variants b) the exact propagation of the combustion educt R—O, R—H and/or the combustion educt mixture MRR-O, MRR-H injected through the inlet openings 31; 31$a$, 31$i$ in at least one of the passages A1, A2, A3 also depends on various factors, which are taken into account individually or in combination, wherein the factors are as follows:

- direction and amount of the impulse of the combustion educt R—O, R—H or of the process medium-educt mixture MRR-O, MRR-H;
- design of the geometry, of the diameter, position and the injection angle of the injection openings;
- swirl number (corresponds to the amount of the swirl strength) and speed of the combustion educt R—O, R—H and/or the process medium-educt mixture MRR-O, MRR-H;
- radial extension of the corresponding passage(s) A1, A2, A3;
- distance of the injection openings 31 if arranged in different planes EX1, EX2) in an axial direction of the passages A1, A2, A3.

In the design variant b) the propagation does not depend on the direction and the amount of the impulse of the process medium M because no process medium M is injected through the injection opening 11 in the design example b).

It is understood that in this second design variant b) the burner 100, 100' is also designed accordingly or that it includes the corresponding means so as to be able to influence the factors which also characterise the method.

By adequately setting the factors it is avoided that the oxidation medium R—O or the process medium-educt mixture MRR-O reaches the injection openings 31; 31a, 31i of the fuel medium R—H or of the process medium-educt mixture MRR-H, or that the fuel medium R—H or the process medium-educt mixture MRR-H reaches the injection openings 31; 31a, 31i of the oxidation medium R—O or of the process medium-educt mixture MRR-O.

In a preferred example of the selection of the said factors where injection openings 31; 31a, 31i are arranged in a radially opposite way on a plane E (cf. FIGS. 3A, 3C, 3E, 3F and 3G and related descriptions) to inject the oxidation medium R—O and the fuel medium R—H or process medium-educt mixtures MRR-O, MRR-H e. g. within a passage A1 it is provided that the impulse of the process medium M injected through the injection opening 11 (according to the design variant a) and c)) depending on the inflow direction of the combustion educts R—O, R—H and in relation to the impulses of the combustion educts R—O, R—H or the process medium-educt mixtures MRR-O, MRR-H is big such that the penetration depth of the combustion educts R—O, R—H or of the process medium-educt mixtures MRR-O, MRR-H within the plane E of the injection openings 31; 31a, 31i is small, which ensures that the inertisation front IF is formed and both combustion educts R—H, R—O mix with each other only downstream of this inertisation front IF.

In other words, the impulse of the process medium M injected through the injection opening 11 is big and the impulses of the combustion educts R—H, R—O injected through the injection openings 31; 31a, 31i are small or so small that the impulse of the process medium M injected through the injection opening 11 prevents the combustion educts R—O, R—H or the process medium-educt mixtures MRR-O, MRR-H from mixing with each other at the injection openings 31; 31a, 31i.

This approach can also be selected the injection openings 31; 31a, 31i not being arranged in an opposite manner in one plane E-X1, E-X1 (see FIGS. 3B and 3D and related descriptions) to inject the oxidation medium R—O and the fuel medium R—H or the process medium-educt mixtures MRR-O, MRR-H within one passage A1.

Another preferred example of the selection of the said factors provides for a non-orthogonal injection of the combustion educts R—O, R—H or process medium-educt mixtures MRR-O, MRR-H in respect of the longitudinal axis X of the burner 100, 100'. For example, an injection angle of 45° is chosen in reference to the flow direction of the process medium M (design variant a) and c)) or in reference to the longitudinal axis X of the burner 100, 100' (design variant b)) with downstream oriented injection openings 31; 31a, 31i, whereby the penetration depth of the combustion educts R—O, H—O or of the process medium-educt mixtures MRR-O, MRR-H within the plane E (see FIGS. 3A, 3C, 3E, 3F and 3G and related descriptions) or the different planes E-X1, E-X2 (see FIGS. 3B, 3D and related descriptions) of the injection openings 31; 31a, 31i is also reduced and the desired inertisation front IF is formed such that the combustion educts R—O, R—H or the process medium-educt mixtures MRR-O, MRR-H mix with each other only downstream of this inertisation front.

Compared to existing steam generators the combustion chambers of which are operated by rocket burners, the big advantage of the approach according to the invention is the high purity of the generated steam, the good mixing of the combustion educts caused by the swirl and a resulting optimal burnout of the combustion educts, and a longer durability of the burner 100, 100' due to the generation of the inertisation front IF, or reduced maintenance costs. The generated steam as an exemplary combustion end product P can be used directly in a combined cycle steam or gas turbine process to generate power. The method can be applied in smaller plants with an output of only a few kW [kilowatts] or less up to industrial units generating several 100 MW [megawatts].

In an exemplary application of the invention, FIG. 4 shows a potential arrangement of a burner 100' according to the invention and of the related method according to the invention using the example of a steam turbine process. The schematic drawing shows a steam turbine having a high-pressure stage HP, an intermediate-pressure stage IP and a low-pressure stage LP.

For example, it is possible according to the invention to superheat steam $\dot{m}_{Steam}$ from the intermediate-pressure stage MP as shown by the arrow before it enters the low-pressure stage LP of the steam turbine as superheated steam $\dot{m}_{ÜSteam}$.

The burner 100' according to the invention is integrated into the turbine line 63 between the intermediate-pressure stage MP and the low-pressure stage LP and forms the steam superheater. It is understood that this example is only one out of large variety of potential applications as explained in more detail below.

The non-exhaustive table of FIG. 5 lists the process media M, the combustion educts R and the combustion products which can be used in various applications P.

An ordinal number 1 to 9 is assigned to each line. When read from left to right in the columns, each ordinal number 1 to 9 specifies those media that can be used in the burner 100' according to the invention in order to perform the method according to the invention.

The respective ordinal number is found in column 1. Column 2 specifies for each line a process medium M being used according to the invention as an inertisation medium at the same time. Column 3 specifies the first combustion educt R—F, and column 4 the second combustion educt R—O. Column 5 contains the combustion product.

Two examples. First example No. 8: Helium He can be used as process medium M, and hydrogen $H_2$ and oxygen can be used as $O_2$ combustion educts, wherein the combustion product P is a mixture of steam and helium.

Second example No. 9: Water $H_2O$ can be used as a process medium M, ammonia $NH_3$ as the first combustion educt R—H, oxygen $O_2$ as the second combustion educt R—O, wherein the combustion product P is a mixture of nitrogen N2 and water $H_2O$.

Unless otherwise specified, the process/inertisation medium can be used as a gaseous medium, supercritical medium or as a liquid medium in all lines.

There is also the possibility to pre-mix the combustion educts R—H, R—O with the respective process medium M to form process medium-educt mixtures MRR-H, MRR-O before they are injected into the at least one inlet device 20-1, or to mix the combustion educts R—H, R—O in the at least one inlet device 20-1 with the process medium M to form process medium-educt mixtures MRR-H, MRR-O.

The following potential applications according to the invention are assigned to the respective media by means of the ordinal numbers.

The media in the lines having the ordinal numbers 1-5 can be used in the combined cycle gas and steam turbine process, in the pure steam turbine process, in refineries and in vacuum units. Very large quantities of steam are required in each of these processes, which can be produced by the method according to the invention using the burner 100' according to the invention.

The media in the lines having the ordinal numbers 6 and 7 can be used in supercritical cycles based on $CO_2$ to store or generate power. Such cycles are the subject-matter of current research efforts. The described burner 100' and the related method could be used in such cycles with the said media for reheating carbon dioxide $CO_2$.

The media in line 8 can be used in a Stirling process applied for power generation in solar power plants. The process medium is helium He as mentioned above, wherein a partial or complete water condensation is possible.

The media in the lines having the ordinal numbers 9 and 10 are used in Kalina cycles and in cycles using ammonia-water mixtures.

In general, the method according to the invention can be used in applications where a process medium is available which is used at the same time as an inertisation medium. It is provided that the process or inertisation medium is part of a cycle and is made available as an input medium or that it is generated in the respective cycle. For example, the process and inertisation medium is generated only during the combustion of the combustion educts. It is also provided that the combustion educts can be highly reactive. Furthermore, it is the purpose of or it is possible with the method according to the invention to produce a very pure combustion product.

What is claimed is:

1. A method for making a combustion product (P), in which at least two combustion educts (R; R-F; R-O), at least one combustion educt (R) as a fuel medium (R-F) and at least one combustion educt (R) as an oxidation medium (R-O), and at least one process medium (M) comprising inerting properties are supplied in total, in a swirled manner, to a combustion chamber (40) downstream of a burner (100, 100') designed for making a combustion product (P) in order to supply, in a swirling manner, at least two combustion educts (R; R-F; R-O), at least one combustion educt (R) as a fuel medium (R-F) and at least one combustion educt (R) as an oxidation medium (R-O) and at least one process medium (M) comprising inerting properties in total to a combustion chamber (40) arranged downstream of the burner (100, 100') in the flow direction, such that a swirl-stabilized flame (F) is formed in the combustion chamber (40), wherein the burner (100, 100') comprises at least one swirl generator (10) to stabilize the flame (F), wherein the burner (100, 100') has openings (11, 31) in at least one inlet device (20-1; 20-2; 20-3), via which partial mass flows are, in each case, supplied separately from each other to the combustion chamber via openings (11, 31) in at least one inlet device (20-1, 20-2, 20-3) as follows:

separate supply of the combustion educts (R-F; R-O) via educt injection openings (31a, 31i) and separate supply of the inerting process medium (M) via at least one opening (11), or separate supply of the combustion educts (R-F; R-O) via educt injection openings (31a, 31i) by pre-mixing at least one of the combustion educts (R-F, R-O) with the inerting process medium (M) to form a process medium-educt mixture (MR; MRR-F; MRR-O) and separate supply of the inerting process medium (M) via the at least one opening (11), wherein the at least one inlet device (20-1; 20-2; 20-3) comprises at least one passage (A1, A2, A3), in which the educt injection openings (31a; 31i) arranged separately from one another are arranged for separately supplying the combustion educts (R-F; R-O) or the process medium educt mixtures (MR; MRR-F; MRR-O), wherein the at least one inlet device (20-1; 20-2; 20-3) has the at least one process medium supply opening (11) for separately supplying the inerting process medium (M), wherein at least one of the educt injection openings (31a, 31i) of at least one combustion educt (R-F; R-O) viewed downstream of the burner (100, 100'), is arranged at the exit of the at least one inlet device (20-1; 20-2; 20-3) of the combustion chamber (40), wherein the inerting process medium (M) propagates in the at least one passage (A1, A2, A3) and reaches the educt injection openings (31a; 31i), such that the partial mass flows of the combustion educts (R; R-F, R-O) and/or process medium educt mixtures (MR; MRR-F; MRR-O) are displaced by the injection openings (31a, 31i) and converge while forming the swirl-stabilized flame (F) only behind an inertization front (IF) which is formed at the injection openings (31a, 31i) through the simultaneous presence of the inerting process medium (M), wherein the inertization front (IF) is formed between the most downstream injection opening (31a, 31i) of one of the combustion educts (R; R-F, R-O) or one of the process medium-educt mixtures (MR; MRR-F; MRR-O) and the respective combustion educts (R; R-F, R-O) and/or process medium-educt mixtures (MR; MRR-F; MRR-O) converging first in a flame foot (F1) of the flame (F) in the combustion chamber (40).

2. The method according to claim 1, characterized in that at least one of the combustion educts (R; R-F; R-O) and the inerting process medium (M)

are pre-mixed prior to being supplied into the at least one inlet device (20-1, 20-2, 20-3) of the burner (100, 100') via the educt injection openings (31a, 31i) to form a process medium-educt mixture (MR; MRR-F; MRR-O), or are mixed while still in the inlet device (20-1, 20-2, 20-3) after being supplied into the inlet device (20-1, 20-2, 20-3) of the burner (100, 100') via the educt injection openings (31a, 31i) and before they converge to form a process medium-educt mixture (MR; MRR-F; MRR-O).

3. The method according to claim 1, characterized in that if exclusively one first passage (A1) is formed, an inertization front (IF) is formed having an inner inertization zone ($IZ_1$)

between the most downstream opening (31) of one of the combustion educts (R; R-F or R-O) and/or one of the process medium-educt mixtures (MR; MRR-F; MRR-O), or between the most downstream educt injection openings (31a, 31i) of the combustion educts (R; R-F, R-O) and/or the process medium-educt mixtures (MR; MRR-F; MRR-O), and the respective combustion educts (R; R-F, R-O) and/or process medium-educt mixtures (MR; MRR-F; MRR-O) converging in a flame foot (F1) of the flame (F).

4. The method according to claim 1, characterized in that if one first passage (A1) and at least one further passage (A2, A3) are formed, an inertization front (IF) is formed having an inner inertization zone ($IZ_1$) and an outer inertization zone ($I_2$)

between the most downstream opening (31) of one of the combustion educts (R; R-F, R-O) and/or one of the process medium-educt mixtures (MR; MRR-F; MRR- O), or between the most downstream educt injection openings (31a, 31i) of the combustion educts (R; R-F and R-O) and/or of the process medium-educt mixtures (MR; MRR-F, MRR-O), and the respective combustion educts (R; R-F, R-O) and/or process medium-educt mixtures (MR; MRR-F; MRR-O) converging in a flame foot (F1) of the flame (F).

5. The method according to claim 1, characterized in that one swirl generator (10-1, 10-2, 10-3) is associated with the at least one passage (A1, A2, A3), or joint swirl generators or, in each case, a separate swirl generator (10-1, 10-2, 10-3) is/are assigned to a plurality of passages (A1, A2, A3), as a result of which the respective swirl direction and the respective swirl number of the partial mass flows in the at least one passage (A1) or in the plurality of passages (A1, A2, A3) can be predefined, wherein if a plurality of passages (A1, A2, A3) are formed, swirl directions in the same or opposite direction of the partial mass flows having the same or different swirl numbers can be predefined.

6. The method according to claim 1, characterized in that a partial mass flow of the combustion product (P) is branched off like a bypass from the combustion chamber (40) or behind the combustion chamber (40) and is cooled down by adding a cooling medium via a bypass supply line (62) of a bypass return line (60) and is subsequently fed back into the burner (100, 100').

7. The method according to claim 1, characterized in that the total mass flow of the combustion end product (P) is already thermally influenced, in particular cooled, in the combustion chamber (40) by adding a medium, in particular the respective inerting process medium (M) via a supply line (44), as a result of which the total mass flow is increased by the partial mass flow of the supplied medium.

* * * * *